US011432225B2

(12) United States Patent
Mildh et al.

(10) Patent No.: US 11,432,225 B2
(45) Date of Patent: Aug. 30, 2022

(54) PACKET FORWARDING IN INTEGRATED ACCESS BACKHAUL (IAB) NETWORKS

(71) Applicant: Telefonaktiebolaget LM Ericsson (publ), Stockholm (SE)

(72) Inventors: Gunnar Mildh, Sollentuna (SE); Per-Erik Eriksson, Stockholm (SE); Oumer Teyeb, Solna (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 319 days.

(21) Appl. No.: 16/319,907

(22) PCT Filed: Dec. 19, 2018

(86) PCT No.: PCT/SE2018/051342
§ 371 (c)(1),
(2) Date: Jan. 23, 2019

(87) PCT Pub. No.: WO2019/139524
PCT Pub. Date: Jul. 18, 2019

(65) Prior Publication Data
US 2020/0084688 A1 Mar. 12, 2020

Related U.S. Application Data

(60) Provisional application No. 62/616,402, filed on Jan. 11, 2018.

(51) Int. Cl.
*H04W 40/22* (2009.01)
*H04W 40/24* (2009.01)
(Continued)

(52) U.S. Cl.
CPC ......... *H04W 40/22* (2013.01); *H04L 12/4633* (2013.01); *H04W 40/24* (2013.01); *H04W 76/12* (2018.02); *H04W 88/08* (2013.01)

(58) Field of Classification Search
CPC ..... H04W 40/22; H04W 76/12; H04W 40/24; H04W 88/08; H04L 12/4633
See application file for complete search history.

(56) References Cited

U.S. PATENT DOCUMENTS 9,380,637 B2   6/2016  Huang
11,140,695 B1* 10/2021 Eyuboglu ......... H04W 72/1257
(Continued)

FOREIGN PATENT DOCUMENTS

WO   2016184150 A1   11/2016

OTHER PUBLICATIONS

"3rd Generation Partnership Project; Technical Specification Group Services and System Aspects; System Architecture for the 5G System; Stage 2 (Release 15)", 3GPP TS 23.501 V2.0.0, Dec. 2017, pp. 1-183.
(Continued)

*Primary Examiner* — Huy D Vu
*Assistant Examiner* — Bailor C Hsu
(74) *Attorney, Agent, or Firm* — Christopher & Weisberg, P.A.

(57) ABSTRACT

Exemplary embodiments include methods and/or procedures performed by a first intermediate node of a multi-hop, integrated access backhaul communication network. Embodiments include receiving a data packet destined for a target node of the communication network, the first intermediate node being configured to communicate with the target node via a second intermediate node of the network. Embodiments include determining an address for the data packet based on a mapping function associated with the target node, and forming a packet header, including the previously-determined address, for the data packet. Forming the packet header can include at least one of the following operations: excluding one or more higher-layer protocol
(Continued)

headers related to the second intermediate node; and incorporating without modification a portion, associated with the target node, of an existing header of the data packet. Embodiments include sending the data packet, comprising the packet header, to the address via the second intermediate node.

32 Claims, 20 Drawing Sheets

(51) Int. Cl.
    *H04W 88/08*           (2009.01)
    *H04W 16/26*           (2009.01)
    *H04W 76/12*           (2018.01)
    *H04L 12/46*            (2006.01)

(56) References Cited

U.S. PATENT DOCUMENTS

| | | | |
|---|---|---|---|
| 2011/0296007 A1* | 12/2011 | Liu | H04L 65/608 709/224 |
| 2012/0309384 A1* | 12/2012 | Faerber | H04W 72/082 455/422.1 |
| 2013/0315134 A1* | 11/2013 | Halfmann | H04W 84/047 370/315 |
| 2014/0056124 A1* | 2/2014 | Yeow | H04W 8/30 370/221 |
| 2015/0373615 A1* | 12/2015 | Hampel | H04L 69/321 370/329 |
| 2016/0227449 A1* | 8/2016 | Sivakeesar | H04W 88/16 |
| 2018/0337846 A1* | 11/2018 | Lee | H04L 45/50 |
| 2018/0368109 A1* | 12/2018 | Kim | H04W 72/0433 |
| 2019/0075023 A1* | 3/2019 | Sirotkin | H04W 88/08 |
| 2019/0132096 A1* | 5/2019 | Abedini | H04L 5/0044 |
| 2019/0349834 A1* | 11/2019 | Teyeb | H04W 84/18 |
| 2020/0007223 A1* | 1/2020 | Zhu | H04B 7/2606 |
| 2021/0051512 A1* | 2/2021 | Hampel | H04W 80/06 |
| 2021/0099385 A1* | 4/2021 | Huang | H04W 76/12 |

OTHER PUBLICATIONS

"3GPP TR 38.801 V2.0.0 (Mar. 2017)", 3rd Generation Partnership Project; Technical Specification Group Radio Access Network; Study on New Radio Access Technology; Radio Access Architecture and Interfaces (Release 14), Mar. 2017, pp. 1-90.

"3GPP TS 33.401 V15.1.0 (Sep. 2017)", 3rd Generation Partnership Project; Technical Specification Group Services and System Aspects; 3GPP System Architecture Evolution (SAE); Security architecture (Release 15), Sep. 2017, pp. 1-161.

"3GPP TS 38.401 V15.0.0 (Dec. 2017)", 3rd Generation Partnership Project; Technical Specification Group Radio Access Network; NG-RAN; Architecture description (Release 15), Dec. 2017, pp. 1-23.

"3GPP TS 38.473 V15.0.0 (Dec. 2017)", 3rd Generation Partnership Project; Technical Specification Group Radio Access Network; NG-RAN; F1 application protocol (F1AP); (Release 15), Dec. 2017, pp. 1-90.

"3GPP TR 38.874 V0.6.0", 3rd Generation Partnership Project; Technical Specification Group Radio Access Network; Study on Integrated Access and Backhaul; (Release 15), Nov. 2018, pp. 1-93.

Pateromichelakis, Emmanouil, et al., "Service-Tailored User-Plane Design Framework and Architecture Considerations in 5G Radio Access Networks", IEEE Access; Digital Object Identifier 10.1109; Access.2017.2736579; vol. 5, Aug. 7, 2017, pp. 1-17.

* cited by examiner

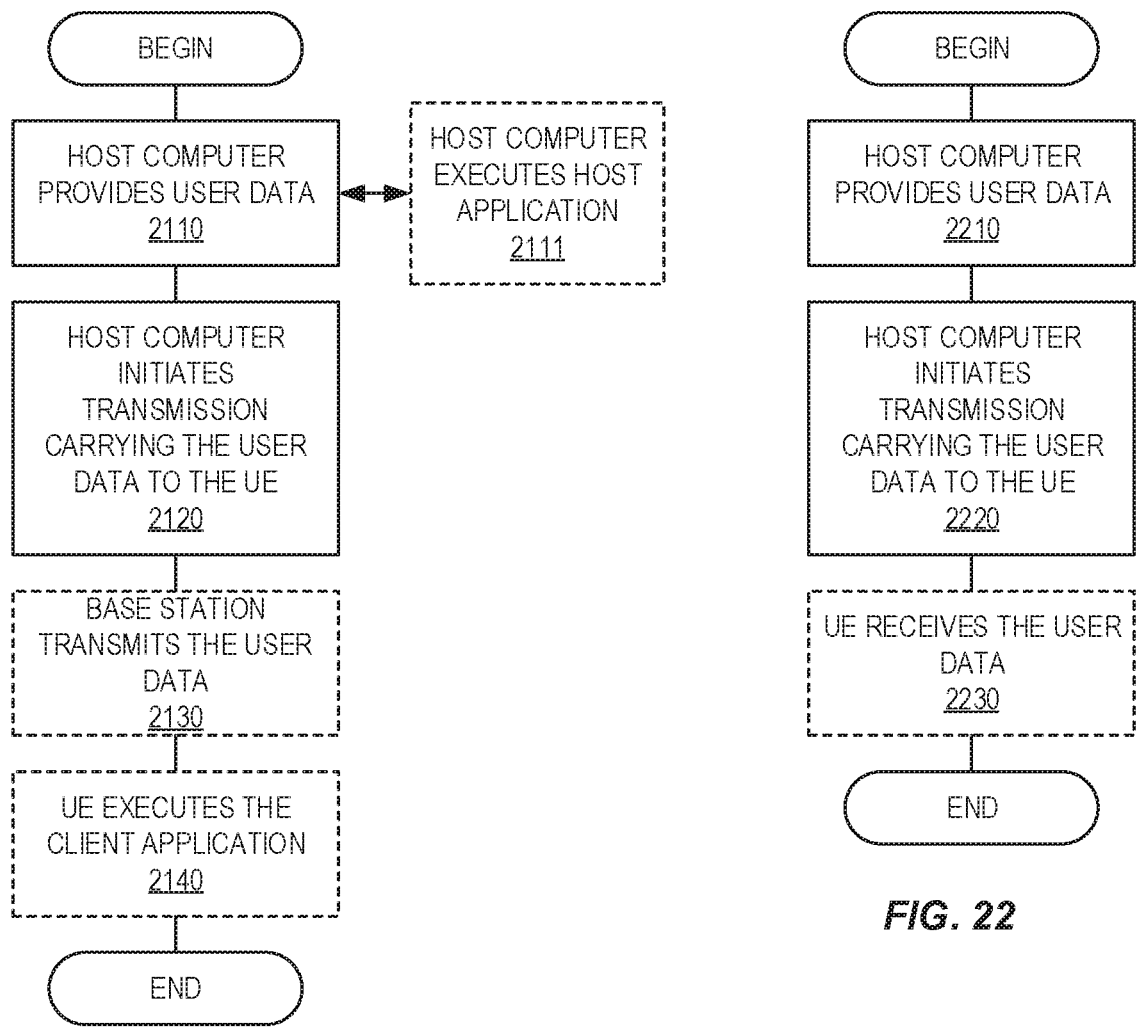

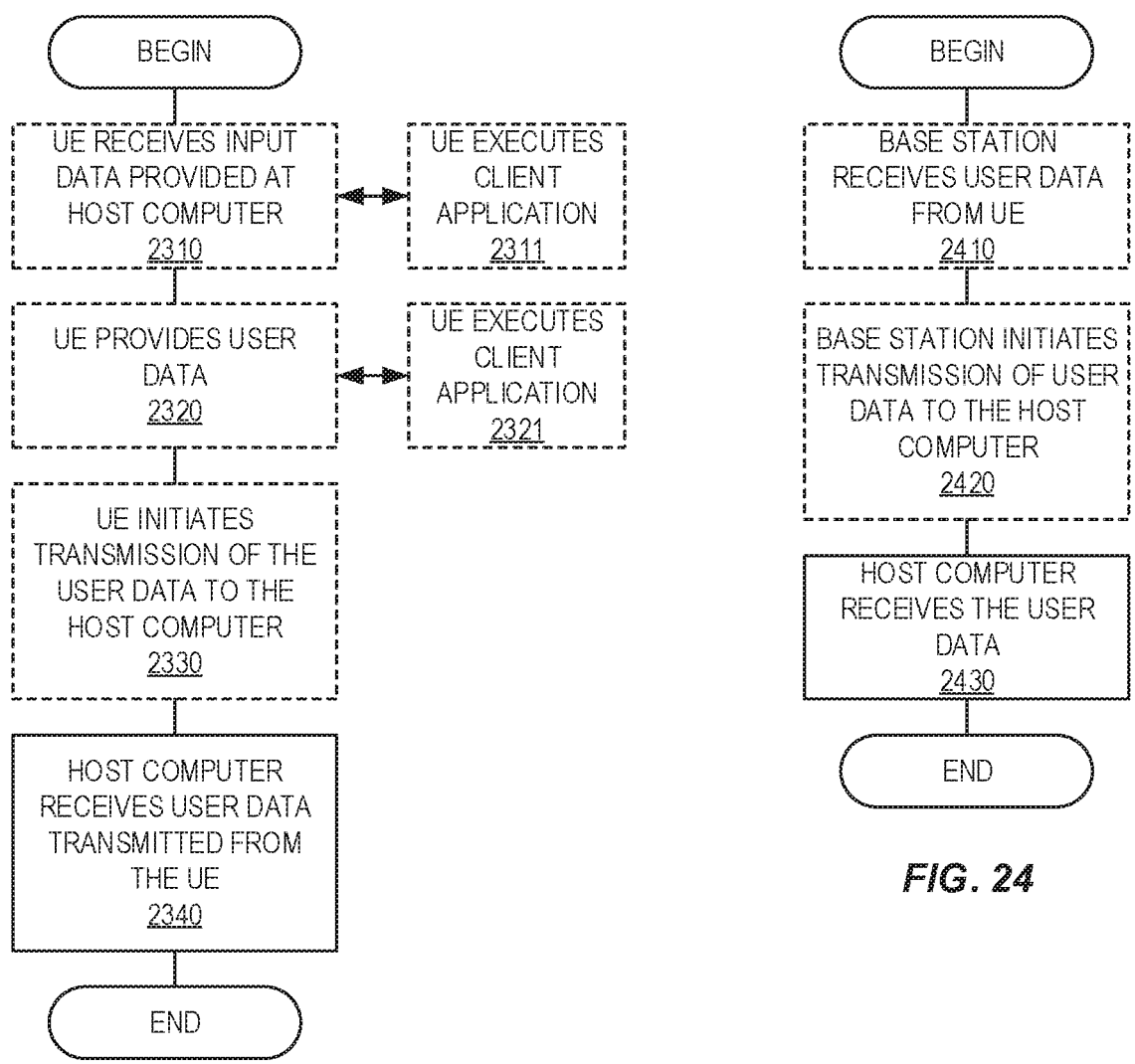

PACKET FORWARDING IN INTEGRATED ACCESS BACKHAUL (IAB) NETWORKS

TECHNICAL FIELD

The present application relates generally to the field of wireless communication networks, and more specifically to so-called integrated access backhaul (IAB) networks in which network nodes utilize wireless communications both to provide access to devices and to relay (e.g., "backhaul") communications from devices and/or other nodes to a core network.

BACKGROUND

FIG. 1 illustrates a high-level view of a fifth-generation (5G) cellular (e.g., wireless) network architecture, consisting of a Next Generation RAN (NG-RAN) and a 5G Core (5GC). The NG-RAN can include a set of gNodeB's (gNBs) connected to the 5GC via one or more NG interfaces, whereas the gNBs can be connected to each other via one or more Xn interfaces. Each of the gNBs can support frequency division duplexing (FDD), time division duplexing (TDD), or a combination thereof. The radio technology for the NG-RAN is often referred to as "New Radio" (NR).

The NG RAN logical nodes shown in FIG. 1 (and described in TS 38.401 and TR 38.801) include a Central Unit (CU or gNB-CU) and one or more Distributed Units (DU or gNB-DU). The CU is a logical node that is a centralized unit that hosts higher-layer protocols and includes a number of gNB functions, including controlling the operation of DUs. A DU is a decentralized logical node that hosts lower-layer protocols and can include, depending on the functional split option, various subsets of the gNB functions. As such, the terms "central unit" and "centralized unit" are used interchangeably herein, as are the terms "distributed unit" and "decentralized unit."

The gNB-CU connects to gNB-DUs over respective F1 logical interfaces. The gNB-CU and connected gNB-DUs are only visible to other gNBs and the 5GC as a gNB, e.g., the F1 interface is not visible beyond gNB-CU. Furthermore, the F1 interface between the gNB-CU and gNB-DU is specified, or based on, the following general principles:

F1 is an open interface;

F1 supports the exchange of signalling information between respective endpoints, as well as data transmission to the respective endpoints;

from a logical standpoint, F1 is a point-to-point interface between the endpoints (even in the absence of a physical direct connection between the endpoints);

F1 supports control plane (CP) and user plane (UP) separation, such that a gNB-CU may be separated in CP and UP;

F1 separates Radio Network Layer (RNL) and Transport Network Layer (TNL);

F1 enables exchange of user-equipment (UE) associated information and non-UE associated information;

F1 is defined to be future proof with respect to new requirements, services, and functions;

A gNB terminates X2, Xn, NG and S1-U interfaces and, for the F1 interface between DU and CU, utilizes the F1 application part protocol (F1-AP) which is defined in 3GPP TS 38.473.

As briefly mentioned above, a CU can host higher-layer protocols such as, e.g., F1-AP, SCTP, GTP, PCDP, UDP, IP, and RRC. In contrast, a DU can host lower-layer protocols such as, e.g., RLC, MAC and PHY. Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some exemplary embodiments, the CU ican host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

It has also been agreed in 3GPP RAN3 Working Group (WG) to support a separation of the gNB-CU into a CU-CP function (including RRC and PDCP for signaling radio bearers) and CU-UP function (including PDCP for user plane). The CU-CP and CU-UP parts communicate with each other using the E1-AP protocol over the E1 interface. FIG. 2 shows an exemplary gNB architecture based on the DU-CU split and the further separation between CU-CP and CU-UP.

In the gNB split CU-DU architecture, DC can be achieved by means of allowing a UE to connect to multiple DUs served by the same CU or by allowing a UE to connect to multiple DUs served by different CUs. As illustrated in FIG. 1, a gNB can include a gNB-CU connected to one or more gNB-DUs via respective F1 interfaces, all of which are described hereinafter in greater detail. In the NG-RAN architecture, however, a gNB-DU can be connected to only a single gNB-CU.

The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In NG-Flex configuration, each gNB is connected to all 5GC nodes within a pool area. The pool area is defined in 3GPP TS 23.501. If security protection for control plane and user plane data on TNL of NG-RAN interfaces has to be supported, NDS/IP (3GPP TS 33.401) shall be applied.

Densification via the deployment of more and more base stations (e.g., macro or micro base stations) is one of the mechanisms that can be employed to satisfy the increasing demand for bandwidth and/or capacity in mobile networks, which is mainly driven by the increasing use of video streaming services. Due to the availability of more spectrum in the millimeter wave (mmw) band, deploying small cells that operate in this band is an attractive deployment option for these purposes. However, the normal approach of connecting the small cells to the operator's backhaul network with optical fiber can end up being very expensive and impractical. Employing wireless links for connecting the small cells to the operator's network is a cheaper and more practical alternative. One such approach is an integrated access backhaul (IAB) network where the operator can utilize part of the radio resources for the backhaul link.

IAB has been studied earlier in 3GPP in the scope of Long Term Evolution (LTE) Rel-10. In that work, an architecture was adopted where a Relay Node (RN) has the functionality of an LTE eNB and UE modem. The RN is connected to a donor eNB which has a S1/X2 proxy functionality hiding the RN from the rest of the network. That architecture enabled the Donor eNB to also be aware of the UEs behind the RN and hide any UE mobility between Donor eNB and Relay Node(2) on the same Donor eNB from the CN. During the Rel-10 study, other architectures were also considered including, e.g., where the RNs are more transparent to the Donor gNB and allocated a separate stand-alone P/S-GW node.

For 5G/NR, similar options utilizing IAB can also be considered. One difference compared to LTE is the gNB-CU/DU split described above, which separates time critical RLC/MAC/PHY protocols from less time critical RRC/PDCP protocols. It is anticipated that a similar split could also be applied for the IAB case. Other IAB-related differences anticipated in NR as compared to LTE are the support of multiple hops and the support of redundant paths.

Nevertheless, the NG-RAN split CU/DU architecture exemplified by FIG. 1 creates certain difficulties for IAB. For example, the potential for gNBs to connect to UEs through multiple Relay Nodes (also referred to as "IAB nodes") can create certain difficulties due to the cascading of the protocol processing within those respective RNs or IAB nodes.

SUMMARY

Accordingly, exemplary embodiments of the present disclosure address shortcomings in NG-RAN split DU/CU architectures that are arranged in an IAB configuration, thereby enabling the otherwise-advantageous deployment of IAB solutions. Such exemplary embodiments can include methods and/or procedures performed in a first intermediate node (e.g., gNB-DU, IAB node, base stations, or component thereof) of a multi-hop, IAB network. The exemplary methods and/or procedures can include receiving a data packet destined for a target node of the communication network. The first intermediate node can be configured to communicate with the target node via at least a second intermediate node of the communication network. The exemplary methods and/or procedures can also include determining an address for the data packet based on a mapping function associated with the target node. In some embodiments, the mapping can be received from a gNB-CU.

The exemplary methods and/or procedures can also include forming a packet header for the data packet, wherein the packet header includes the previously-determined address. Furthermore, forming the packet header can include at least one of the following operations: excluding one or more higher-layer protocol headers related to the second intermediate node; and incorporating without modification a portion, associated with the target node, of an existing header of the data packet. In some embodiments, the excluded one or more higher-layer protocol headers can include one or more of the following types of headers comprising addresses associated with the second intermediate node: IP, UDP, and GTP.

The exemplary method and/or procedure can also include sending the data packet, comprising the packet header, to the address via the second intermediate node. In some embodiments, these operations can include transparently forward the data packet to the target node via a GTP tunnel through the second intermediate node.

In some embodiments, the target node can be an access node serving a UE, the first intermediate node can be a gNB-DU, the second intermediate node can be an IAB node, and the data packet can be a downlink data packet destined for the UE via the access node. In such embodiments, the data packet can be sent to the address via a radio bearer between the gNB-DU and the IAB node.

In other embodiments, the target node can be gNB-CU, the first intermediate node can be a first IAB node, the second intermediate node can be a second IAB node or a gNB-DU, and the data packet can be a uplink data packet transmitted by the UE. In such embodiments, the data packet can be sent to the address via a radio bearer between the first IAB node and the second IAB node.

In some embodiments, the exemplary methods and/or procedures can also include receiving an indication that a path to the target network via the second intermediate node is unavailable. In such embodiments, the exemplary methods and/or procedures can also include forming a packet header for the data packet, the packet header including the previously-determined address. Forming the packet header can include at least one of the following operations: excluding one or more higher-layer protocol headers related to the third intermediate node; and incorporating without modification a portion, associated with the target node, of an existing header of the data packet. Furthermore, in such embodiments, the exemplary methods and/or procedures can also include sending the data packet, comprising the packet header, to the address via the third intermediate node.

Exemplary embodiments also include network nodes (e.g., gNB-DU, IAB nodes, base stations, or components thereof) adapted and/or configured to perform the operations of the above-described exemplary methods and/or procedures. Other exemplary embodiments include non-transitory, computer-readable media storing computer-executable instructions embodying operations corresponding to various exemplary methods and/or procedures described herein.

BRIEF DESCRIPTION OF THE DRAWINGS

FIGS. 21-24 are flow diagrams illustrating various exemplary methods and/or procedures implemented in a communication system, according to various exemplary embodiments of the present disclosure.

DETAILED DESCRIPTION

Exemplary embodiments briefly summarized above will now be described more fully with reference to the accompanying drawings. These descriptions are provided by way of example to explain the subject matter to those skilled in the art, and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Figure 1:
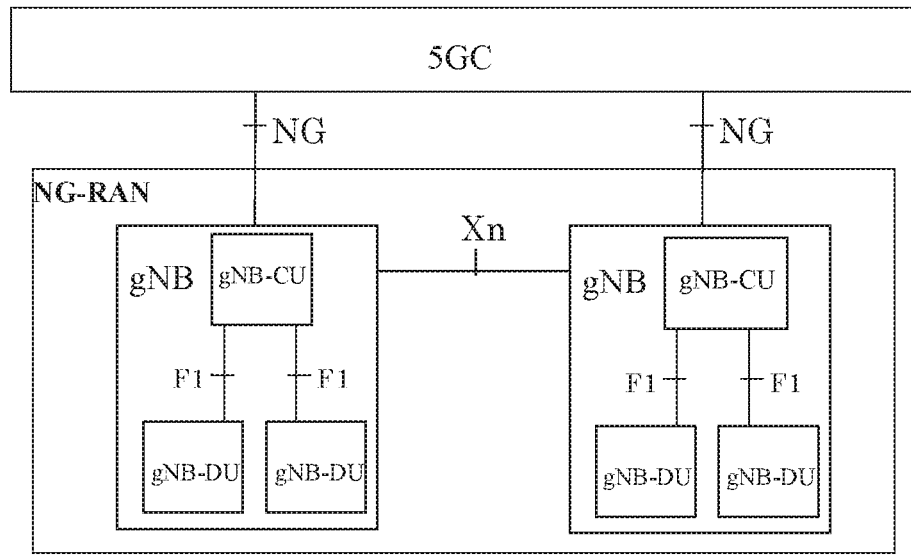
FIG. 1 illustrates a high-level view of a fifth-generation (5G) cellular (e.g., wireless) network architecture.
Figure 2:
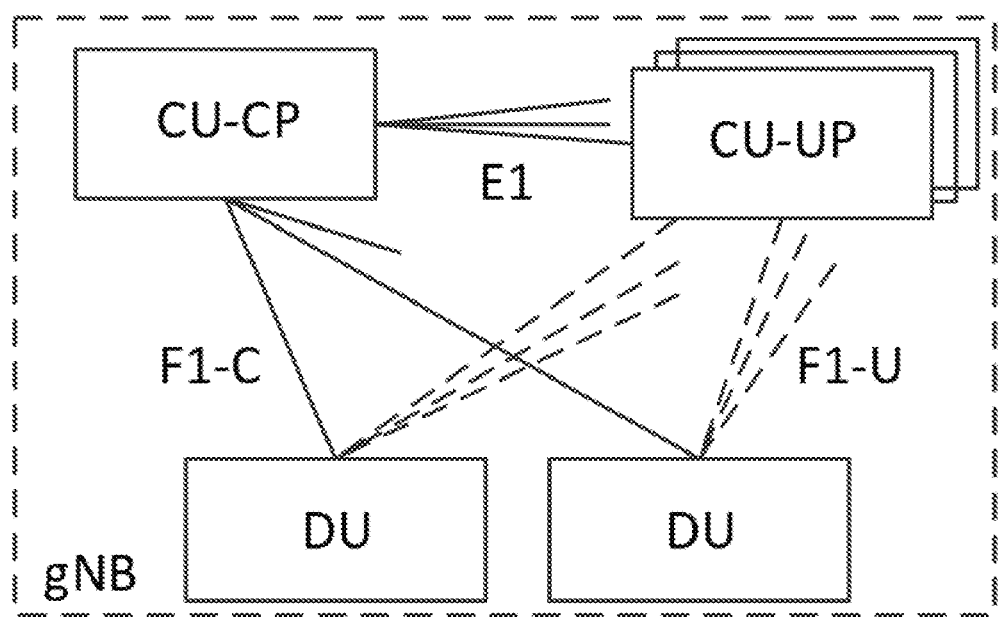
FIG. 2 shows an exemplary gNB architecture based on the DU-CU split and the further separation between CU-CP and CU-UP.

As briefly mentioned above, the NG-RAN split CU/DU architecture exemplified by FIG. 1 creates certain difficulties for IAB. For example, the potential for gNBs to connect to UEs through multiple Relay Nodes (also referred to as "IAB nodes") can create certain difficulties due to the cascading of the protocol processing within those respective RNs or IAB nodes. This is discussed in more detail below.

In LTE, the RN was a full eNB but the donor eNB had S1/X2 proxy functionality hiding the RN functionality from the rest of the network. In NR, the gNB-CU/DU split allows the CU functionality, which terminates RRC/PDCP and NG/Xn interfaces, to be located in a central place while the DU, which terminates RLC/MAC/PHY, to be distributed. As applied to IAB, the "DU" part of the IAB node would terminate RLC/MAC/PHY layers towards the user equipment (UE) while the RRC/PDCP layers would be terminated in the CU that is connected to the traditional transport network. In this solution, a logical F1 interface would be supported between "DU" part of the IAB node and the CU functionality.

Figure 3:
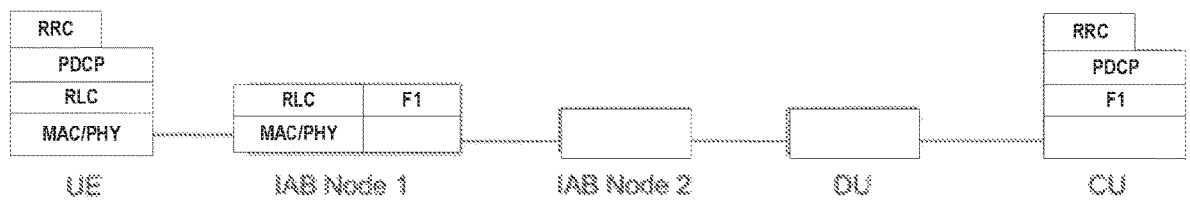
FIG. 3 shows an exemplary Integrated Access Backhaul (IAB) network architecture having a particular arrangement of protocol stacks and interfaces.

FIG. 3 shows an exemplary IAB network architecture embodying this arrangement of protocol stacks and interfaces. In this configuration, when the IAB node becomes operational, it will connect to the network as a special UE, receive its own IP address, and associate with a UPF (User Plane Function) in the operator's network. This UPF will receive data that is destined to the IAB node. For example, this UPF can be co-sited with the CU serving the IAB node. Once the IAB node has an IP address it can begin to establish the F1 interface to the CU, as customary for a DU. From the CU's point of view, the IAB node looks in principle as a normal DU, while from the core network (CN) point of view, the IAB node will resemble a UE.

Figure 4:
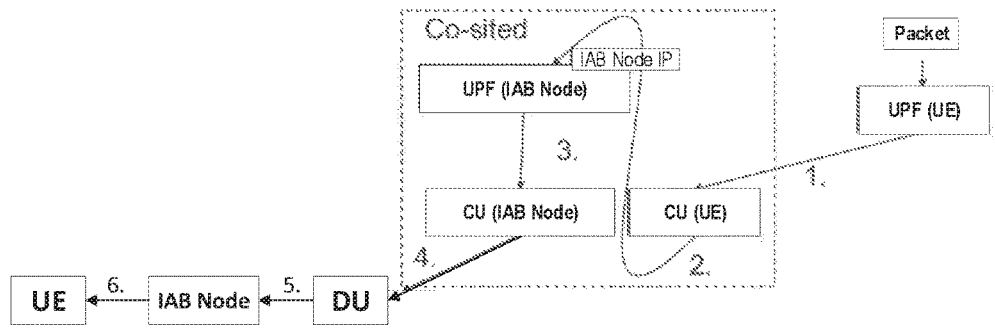
FIG. 4 shows an exemplary user plane (UP) data path for a single-hop IAB network.

FIG. 4 shows an exemplary user plane (UP) path for a single hop IAB node. The data flow path for a packet destined for the UE is described by the following numbered operations, which correspond to the numerical labels in FIG. 4:

1. A downlink (DL) packet destined for the UE passes through the UPF for the UE, and is sent to the CU that is serving the UE.
2. The CU which has the UE's context knows that the UE is located in the IAB Node and therefore sends the packet in a F1-U GTP tunnel to the IAB Node's IP address.
3. The UPF function serving the IAB Node knows that the IAB Node is located in the CU that has the IAB Node's context.
4. The CU with the IAB context knows the IAB is located under DU and therefore sends the packet in a F1-U GTP tunnel to the DU's IP address.
5. The DU decapsulates the F1-U GTP tunnel and delivers the packet to the IAB Node on a radio bearer belonging to the IAB node.
6. The IAB node decapsulates the F1-U GTP tunnel and delivers the packet to the UE on a radio bearer belonging to the UE.

The advantage of this approach is that it has minimum impact on existing standards since normal UE/network functionalities are reused. It also transparently supports any IP traffic towards the IAB node. Nevertheless, one drawback with this approach is that each IAB node will have its own UPF function, resulting in cascaded UPF and CU functions for multi-hopping scenarios where IAB nodes that connect through other IAB nodes. For example, a DL packet to the UE would first transition the UPF of the first IAB node, then the CU of the first IAB node, then the UPF of the second IAB node (e.g., that the first IAB node is connected to), then the CU of the second IAB node, etc. Each loop will increase processing time and reduce capacity by adding overhead (e.g., GTP/UDP/IP/PDCP).

Figure 5:
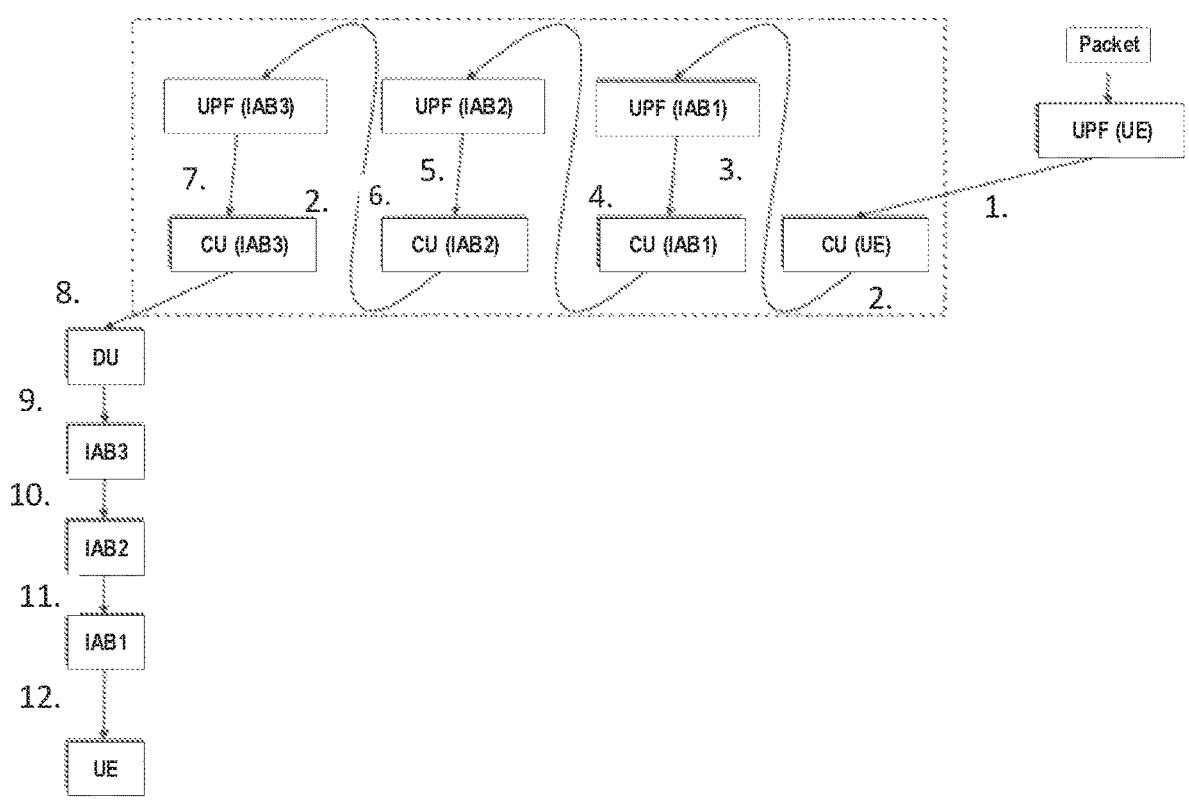
FIG. 5 illustrates an exemplary path of user-plane (UP) data in an exemplary three-hop IAB arrangement in which a data packet transits UPFs associated with each of the three IAB nodes.

FIG. 5 illustrates an exemplary path of user-plane (UP) data in an exemplary three-hop IAB arrangement in which a data packet transits UPFs associated with each of the three IAB nodes. Each of the numerical labels in FIG. 5 corresponds to a particular operation, in a similar manner as discussed above in relation to FIG. 4. The overhead introduced in the various operations shown in FIG. 5 is described below, with numbers corresponding to labels in the figure.
1. NG-U GTP/UDP/IP(UE)
2. PDCP(UE)+F1-U GTP/UDP/IP(IAB1)
3. PDCP(UE)+F1-U GTP/UDP/IP(IAB1)+NG-U GTP/UDP/IP(IAB1)

4. PDCP(UE)+F1-U GTP/UDP/IP(IAB1)+PDCP(IAB1)+ F1-U GTP/UDP/IP(IAB2)
5. PDCP(UE)+F1-U GTP/UDP/IP(IAB1)+PDCP(IAB1)+ F1-U GTP/UDP/IP(IAB2)+NG-U GTP/UDP/IP(IAB2)
6. PDCP(UE)+F1-U GTP/UDP/IP(IAB1)+PDCP(IAB1)+ F1-U GTP/UDP/IP(IAB2)+PDCP(IAB2)+F1-U GTP/UDP/IP(IAB3)
7. PDCP(UE)+F1-U GTP/UDP/IP(IAB1)+PDCP(IAB1)+ F1-U GTP/UDP/IP(IAB2)+PDCP(IAB2)+F1-U GTP/UDP/IP(IAB3)+NG-U GTP/UDP/IP(IAB3)
8. PDCP(UE)+F1-U GTP/UDP/IP(IAB1)+PDCP(IAB1)+ F1-U GTP/UDP/IP(IAB2)+PDCP(IAB2)+F1-U GTP/UDP/IP(IAB3)+PDCP (IAB3)+F1-U GTP/UDP/IP(DU)
9. PDCP(UE)+F1-U GTP/UDP/IP(IAB1)+PDCP(IAB1)+ F1-U GTP/UDP/IP(IAB2)+PDCP(IAB2)+F1-U GTP/UDP/IP(IAB3)+PDCP (IAB3)+RLC/MAC/PHY (IAB3)
10. PDCP(UE)+F1-U GTP/UDP/IP(IAB1)+PDCP(IAB1)+ F1-U GTP/UDP/IP(IAB2)+PDCP(IAB2)+RLC/MAC/PHY (IAB2)
11. PDCP(UE)+F1-U GTP/UDP/IP(IAB1)+PDCP(IAB1)+ RLC/MAC/PHY (IAB1)
12. PDCP(UE)+RLC/MAC/PHY (UE)

For control plane data (e.g., RRC protocol), the situation is similar except that there is no operation 1, as the message originates from the CU (UE).

As can be seen in FIG. 5, between operations 2 and 12, there are eight (8) PDCP header processings, e.g., the addition and later removal of PDCP(UE), PDCP(IAB1), PDCP (IAB2), and PDCP(IAB3). The addition of a PDCP header entails encryption and (optionally) integrity protection. The integrity protection is customarily used for CP data (e.g., RRC protocol), but it can also be used for UP data (e.g., for UP integrity protection in NR). Performing all these encryption, decryption, integrity protection, and integrity verification operations for every packet can produce considerable increases in latency, processing load, power consumption, and hardware requirements. Despite their other advantages, such requirements could make multi-hop IAB systems unfeasible for networks that support highly delay-sensitive services.

Exemplary embodiments of the present disclosure mitigate, reduce, and/or eliminate the above-described issues incurred due to PDCP processing in a multi-hop IAB systems, by providing forwarding functionality in the intermediate IAB nodes (e.g., Relay Nodes). The forwarding functionality can operate on any one of various protocol layers including, e.g., IP, L2 address, GTP tunnel TEIDs, etc. The forwarding functionality in the intermediate IAB nodes can also be transparent by not performing decapsulation, such that the original headers (e.g., the F1AP header between the access IAB node and the gNB-CU, or the GTP-U header between the gNB-DU and the target IAB node) are maintained without disturbance and/or modification. By reducing the unnecessary processing via intermediate forwarding functionality in a multi-hop IAB configuration, exemplary embodiments provide various benefits including lower power consumptions in the network, resulting in cost and environmental benefits. Other exemplary benefits include reduced latency in the network, leading to improved end user performance or quality of experience. Other exemplary benefits include reduced hardware requirements (e.g., fewer processors and memories), which can reduce network deployment cost and reduce environmental impact caused by manufacture, shipping, installation, etc. of hardware components.

Exemplary embodiments can provide such benefits utilizing various approaches. In some exemplary embodiments, instead of assigning the IAB node an IP address located in a UPF (IAB node) in an operator's network through which the IAB node receives connectivity to the rest of the network (e.g., in the same way as a UE), such connectivity is provided by introducing forwarding functionality in the intermediate nodes (e.g., other IAB node and DUs), providing the connectivity of the IAB node to the rest of the network. For example, this forwarding functionality can be provided at protocol layer 2 (L2) in various ways, including:

1. The IP or L2 address of the IAB node is announced at the DU function of the "donor gNB". The DU then maps packets addressed to this IAB node to specific Radio Bearer(s) serving the IAB node. At the next hop the packets could be mapped to another Radio Bearer(s).
2. The IAB node is assigned a UPF providing L3 or L2 connectivity to the IAB node. This UPF could also be co-located with CU-UP entity terminating PDCP for the IAB node. The UPF/CU-UP function of the first IAB node could be located close to the DU while the UPF/CU-UP function of the second IAB node could be located at the site of the first IAB node. This is different from the solution described in the problem description since in that solution all UPF functions was located centrally in the network (connected to traditional transport). In this solution the UPF of the next hop IAB would be co-sited with the node serving the next hop IAB.
3. The intermediate nodes can forward packets based on GTP Tunnel End Points (TEIDs). For example, the IAB node can be allocated a specific range of GTP TEIDs not used in the DU or other intermediate IAB nodes. In this way, when the DU or intermediate IAB nodes receive packets addressed to these GTP TEIDs, they can map these packets on a Radio Bearer to the IAB node.

Figure 6:
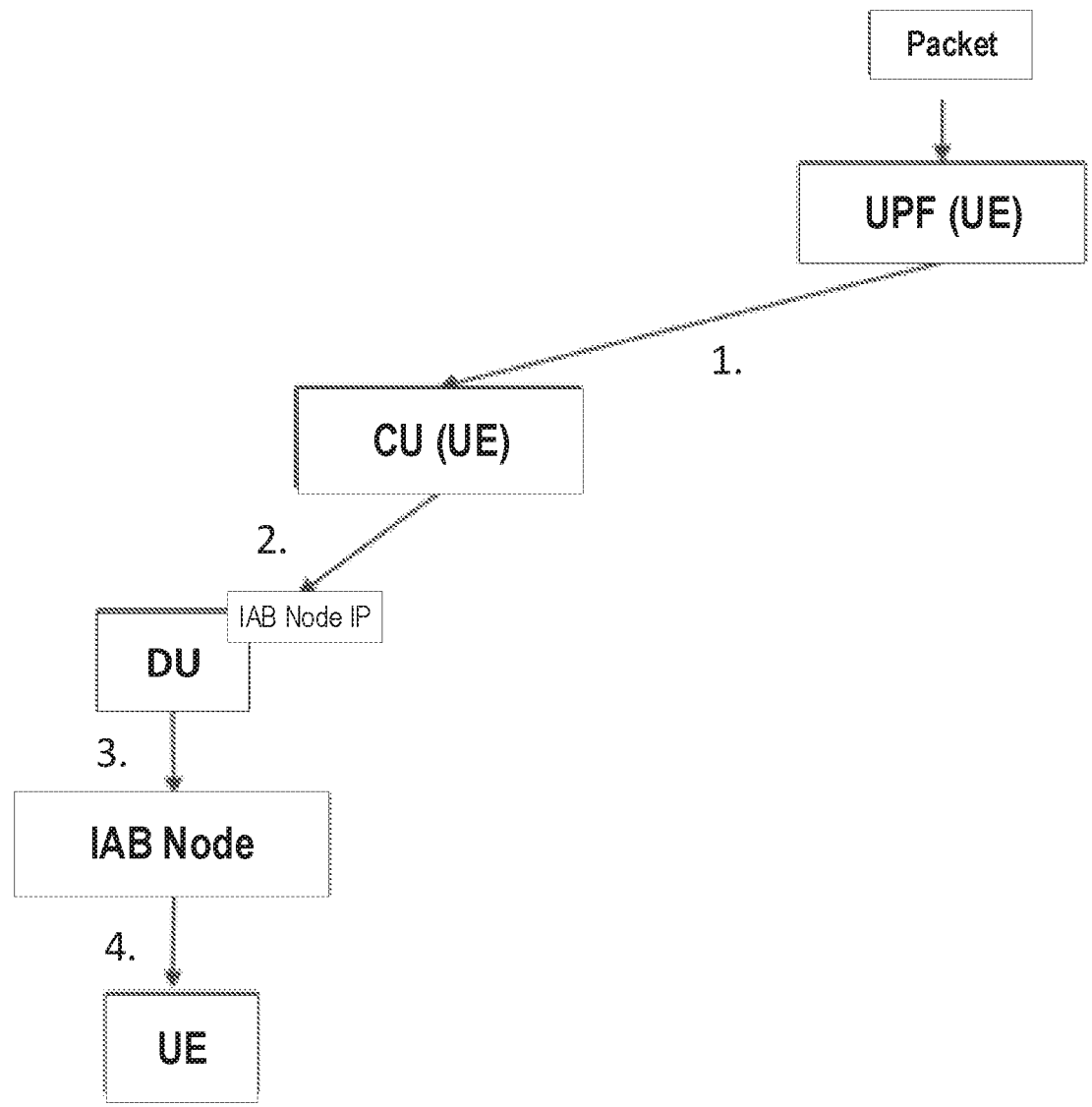
FIG. 6 shows an exemplary single-hop L2/forwarding backhaul technique based on using IP address of the IAB node, according to various exemplary embodiments of the present disclosure.

FIG. 6 shows an exemplary single-hop L2/forwarding backhaul technique based on using IP address of the IAB node, according to various exemplary embodiments of the present disclosure. In the scenario shown in FIG. 6, the DU maps from the IAB node's IP address to the radio bearer on the DU-IAB link. The numbered items in FIG. 6 correspond to the following operations in relation to a downlink (DL) data packet destined to a UE.

1. A downlink (DL) data packet arrives from the 5G Core Network (5GC).
2. The CU holding the destination UE's context knows that the UE is located in the IAB Node, and sends the packet in a F1-U GTP tunnel to the IAB Node's IP address.
3. The DU function serving the IAB Node knows the IAB Node's IP address, captures all packets towards this IP address, and maps them to a Radio Bearer over the IAB backhaul link.
4. The IAB node decapsulates the F1-U GTP tunnel and delivers the packet to the UE on a radio bearer that belongs to the UE.

Although not explicitly shown in FIG. 6, similar operations can be performed for uplink (UL) data packet from UE destined to the network based on a corresponding mapping between a CU IP address (e.g., for the packet destination) and the radio bearer on the DU-IAB link. For example:

1. The UE sends an uplink (UL) data packet to its access IAB node via a radio bearer.
2. The IAB node encapsulates the packet into a F1-U GTP tunnel to the serving CU's IP address, and maps the packet to a backhaul radio bearer on the backhaul link to the DU.
3. The DU receives the packet from the IAB node via the backhaul radio bearer, and maps the packet to the CU's IP address based on the known relationship between the backhaul radio bearer and the CU's IP address.

4. The CU receives the packet from the DU over the F1-U interface, decapsulates the GTP tunnel, and sends the packet to the 5GC.

Figure 7:
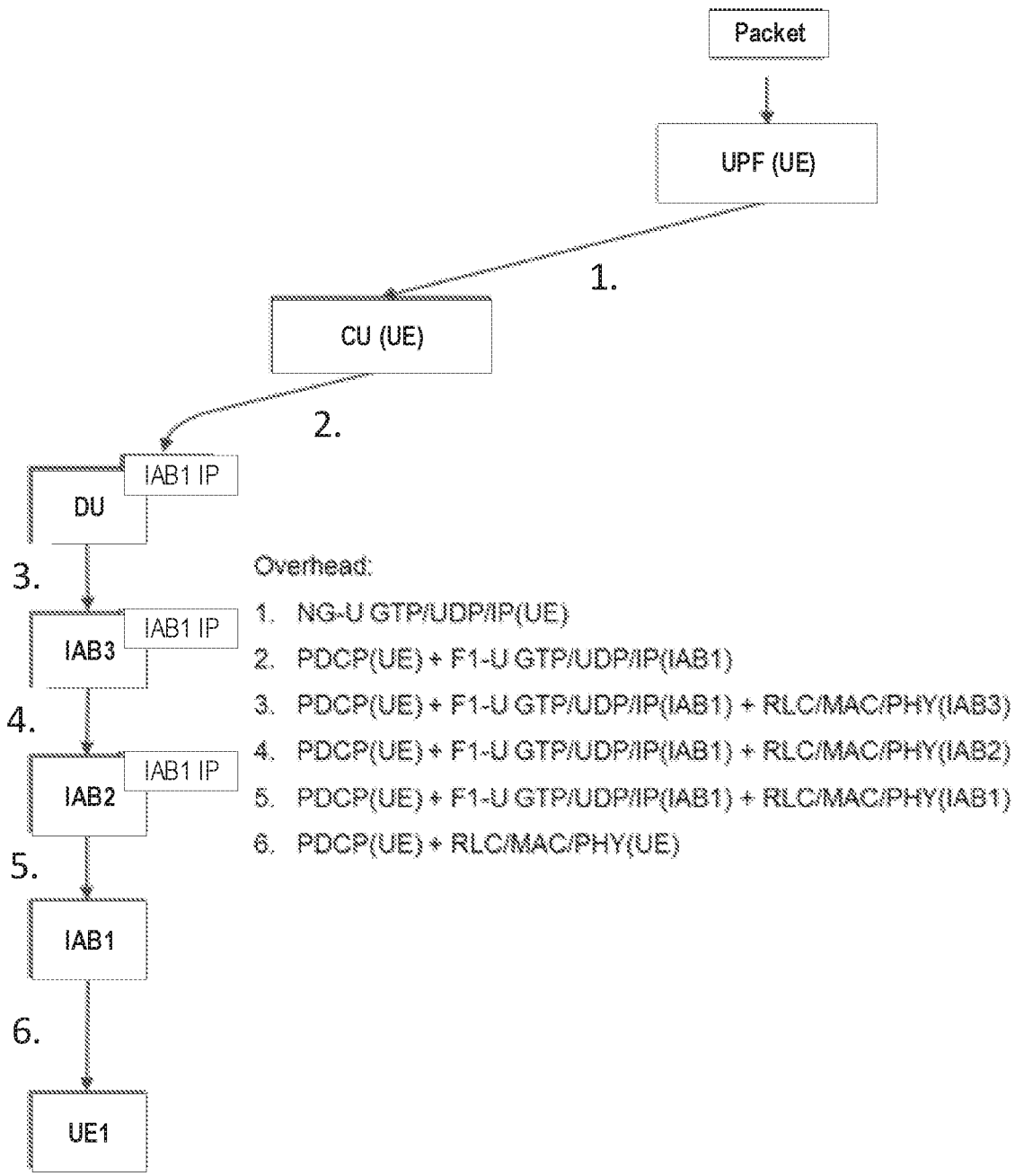
FIG. 7 shows an exemplary three-hop L2/forwarding backhaul technique based on using IP address of the IAB node, according to various exemplary embodiments of the present disclosure.

One advantage of this solution (referred to herein as "L2 solution" or "forwarding solution") is that the processing and signalling overhead does not grow with the number hops, as shown above in relation to problems regarding the so-called L3 solution. FIG. 7 shows an exemplary three-hop L2/forwarding backhaul technique based on using IP address of the IAB node, according to various exemplary embodiments of the present disclosure.

The numerical labels in FIG. 7 correspond to the operations explained below. FIG. 7 also shows the overhead calculations associated with each operation. As shown in FIG. 7 and in the description below, exemplary embodiments facilitate network support for many IAB relaying hops without incurring additional overhead.

1. A downlink (DL) packet arrive from the 5G Core Network (5GC).
2. The CU holding the destination UE's context knows that the UE is located in the IAB Node, and sends the packet in a F1-U GTP tunnel to the IAB Node's IP address.
3. The DU function serving the IAB3 Node knows the IAB1 Node's IP address, captures all packets towards this IP address, and maps them to a Radio Bearer over the IAB backhaul link to IAB3 Node. The F1-U GTP/UDP/IP header associated with the IAB1 node is forwarded unchanged.
4. The IAB3 function serving the IAB3 Node knows the IAB1 Node's IP address, captures all packets towards this IP address, and maps them to a Radio Bearer over the IAB backhaul link to IAB2 Node. The F1-U GTP/UDP/IP header associated with the IAB1 node is forwarded unchanged.
5. The IAB2 function serving the IAB2 Node knows the IAB1 Node's IP address, captures all packets towards this IP address, and maps them to a Radio Bearer over the IAB backhaul link to IAB1 Node. The F1-U GTP/UDP/IP header associated with the IAB1 node is forwarded unchanged.
6. The IAB1 node decapsulates the F1-U GTP tunnel and delivers the packet to the UE on a radio bearer belong to the UE.

In the example embodiments shown above, the mapping is done based on IP address of IAB1 Node. In other exemplary embodiments, the mapping can be based on GTP TEIDs in the F1-U header. In such case the intermediate nodes can either ignore the IP address in the F1-U header, or the IP address of the DU can be used instead avoiding the need for the DU to announce multiple IP addresses on the transport network. In other exemplary embodiments, the mapping can be performed based on L2 addresses (e.g., IEEE MAC address). Moreover, within the F1-C interface, it is possible to do the mapping based on SCTP tunnel associations or content of F1-AP signaling protocol messages (e.g., UE DU or UE CU context identifier).

The various nodes can be configured in various ways to provide the different mappings discussed above. Below are several exemplary configuration procedures that can be utilized for this purpose.

1. Initially, the IAB node connects to the DU (or intermediate IAB nodes) in the same way as a normal UE would connect to the network.

This could include sending an RRC connection request message which the DU (and any intermediate IAB nodes) will forward to the CU.
The CU could respond with an RRC connection setup message.
The IAB node could then send an RRC connection setup complete message which contains NAS information to be forward by the CU to the Core Network. Here it is also possible that the IAB node include slice information indicating to the CU that the IAB node belongs to a specific slice which serves IAB nodes. This would enable the CU to use this information to select a specific AMF which serves the IAB node.
The AMF, when finding out that this is a "special UE", could assign it an IP address from a pool of IP addresses reserved for IAB nodes.
The IAB node can be informed about the IP address allocated to it in the same way as a UE via NAS signaling
The AMF can communicate the IP address of the IAB node to the CU that is serving the IAB node (in normal UE handling, the IP address of the UE is not know either at the CU or the DU)

2. The IAB node also has a DU functionality and, as such, it must setup the DU's F1 interface with a CU in order to be operational. The CU in this case could be the actual CU where the (possibly multi-hop) path towards the CN terminates (i.e. end to end F1), or the next IAB node or DU on the path can act like a CU for the IAB node, akin to a proxy functionality (e.g., in FIG. 7, IAB2 can act like a CU for IAB1, IAB3 can act like a CU to IAB2, etc.)

3. During the initial connection procedure, some network node or function can trigger the installation of mapping rules in the DU and intermediate IAB nodes. This mapping can be communicated to the DU and any intermediate IAB node directly from the CU, or it could be done on a hop by hop basis (e.g., in FIG. 7, the CU can communicate the IP of IAB1 directly to the DU, IAB3 and IAB2; or the CU communicates it to the DU, the DU will then communicate it to IAB3, which will then communicate it to IAB2).

4. The mapping function can be between IP packets and Data Radio Bearers (DRBs) on the radio interface towards other IAB nodes. Also other mapping function can be possible. The node that triggers the setup of mapping function can be AMF serving the IAB nodes or the CU serving the IAB nodes. Either of these nodes can signal towards the DU and IAB nodes the mapping rule, e.g., using RRC or NAS signaling, or using NG-C or F1-AP signaling as the case may be. In case the IAB node is connecting via other IAB nodes, all the IAB nodes in the path could be configured to perform the mapping.

FIGS. 8-11 show exemplary protocol stacks for embodiments involving various mapping options for the F1 Control Plane (F1-C) and F1 User Plane (F1-U) interfaces between the IAB1 node and the CU serving the UE. Various abbreviations appearing in FIGS. 8-11 are defined as follows:

N=NAS layer signaling (e.g., Mobility and Session management signaling)
R=RRC radio resource control signaling
PD=PDCP
RL=RLC
M=MAC
P=Physical layer (PHY)
RB=Radio bearer.

Figure 8:
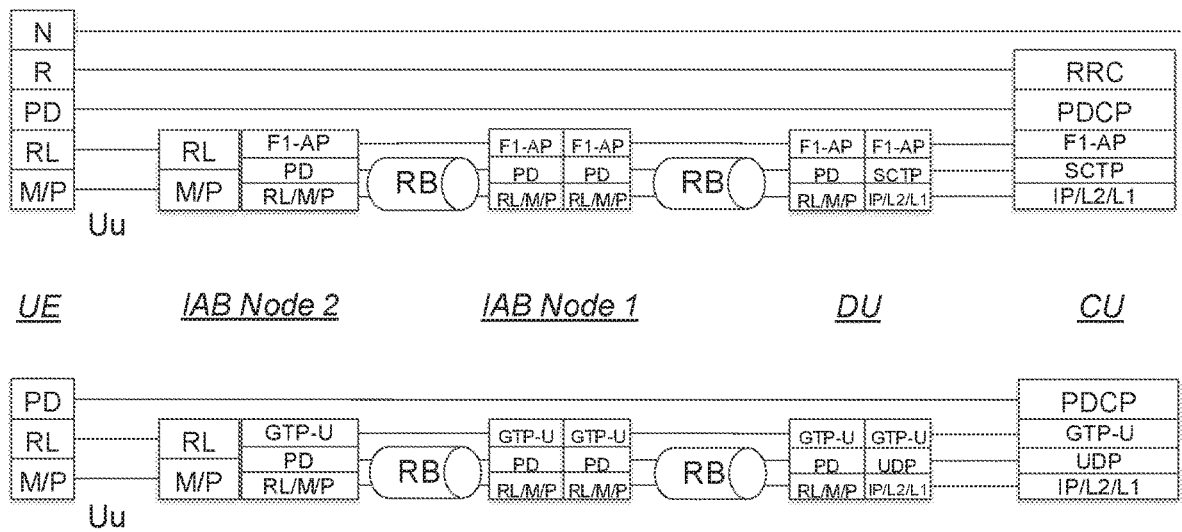
FIGS. 8-11 show exemplary protocol stacks for exemplary embodiments involving various mapping options for the F1 Control Plane (F1-C) and F1 User Plane (F1-U) interfaces between a UE's IAB access node and the CU serving the UE.

FIG. 8 shows exemplary protocol stacks for various embodiments in which the F1-C mapping (illustrated in the top portion of the figure) can be performed as part of the F1-AP protocol (e.g., based on identifiers in the F1-AP protocol), and the F1-U mapping (illustrated in the bottom portion) can be performed using GTP tunnels (e.g., GTP TEIDs). In these embodiments, the intermediate nodes can setup separate F1-AP connectivity on each hop. The intermediate node can then map F1-AP messages between the nodes. The F1-AP connections can also be used to setup separate GTP-U tunnels for user data. The intermediate nodes can map between these tunnels. As shown in FIG. 8, the IP/UDP protocol layers for DL packets are terminated at the DU, such that the IP/UDP protocol headers are not included in the packets sent to the intermediate nodes (e.g., IAB Nodes 1, 2).

Figure 9:
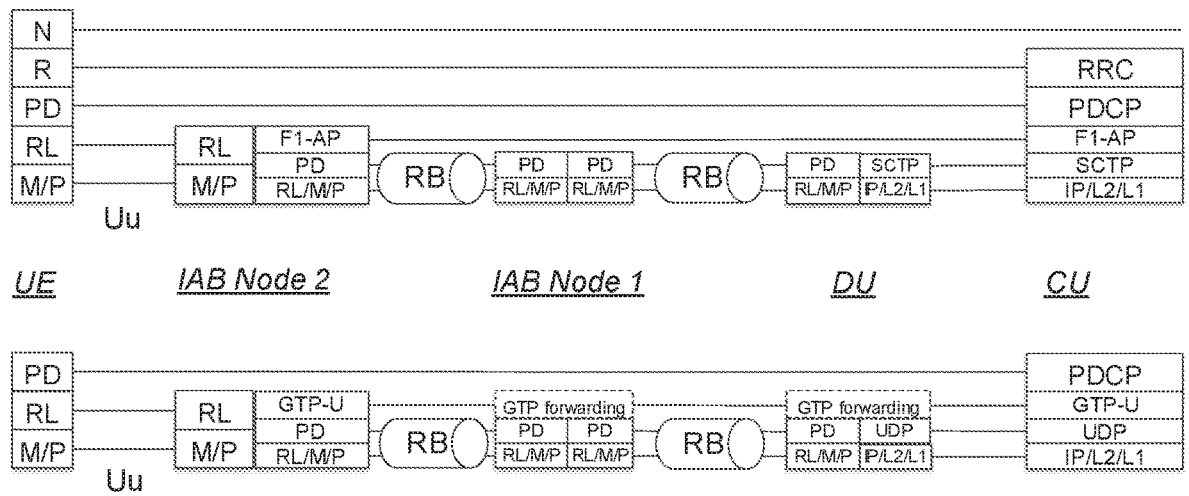

FIG. 9 shows exemplary protocol stacks for various embodiments in which the F1 mapping can be configured based on SCTP associations for F1-C (illustrated in the top portion of the figure) and/or GTP TEID associations for F1-U (illustrated in the bottom portion). In these exemplary embodiments, the GTP TEIDs can be transparently forwarded by the intermediate nodes (e.g., gNB-DU, IAB Node 2) without decapsulation. In these embodiments, the DU can terminate the SCTP connection for IAB1 towards the CU. A separate SCTP connection can be used for each IAB node connected to the DU. The DU can then map F1-AP messages received on this SCTP connection to/from radio bearers. As shown in FIG. 9, the IP/UDP protocol layers for DL packets are terminated at the DU, such that the IP/UDP protocol headers are not included in the packets sent to the intermediate nodes.

Figure 10:
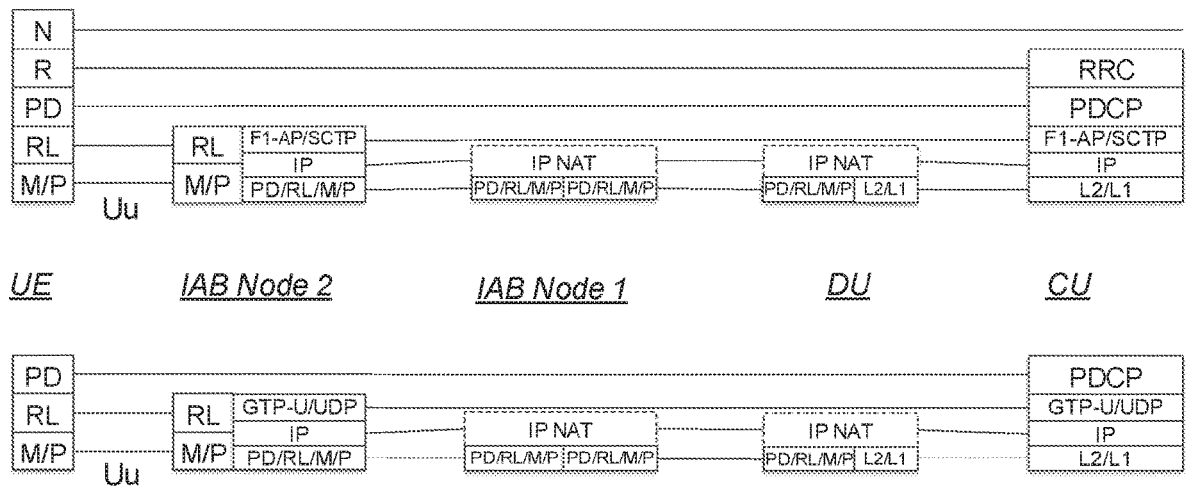

FIG. 10 shows exemplary protocol stacks for various embodiments in which the F1-C and/or F1-U mapping can be configured based on IP address. In FIG. 10, IP NAT (Network Address Translation) is used to map between IP addresses used for the respective hops, which can be, e.g., on different subnets. Other methods are also possible, e.g., IPv6 prefix routing, conventional IP routing, etc. In the exemplary arrangement shown in FIG. 10, the mapping is performed on each hop by DU and the intermediate IAB nodes (e.g., IAB Node 1). Unlike in FIGS. 8-9, the IP/UDP protocol headers are included in the DL packets sent from the DU to the intermediate nodes.

Figure 11:
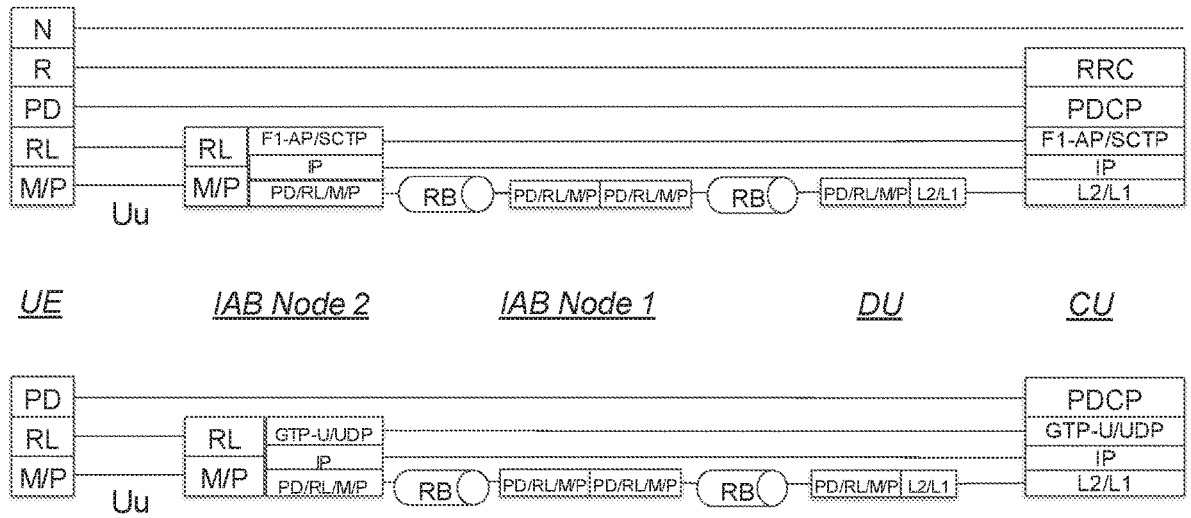

FIG. 11 shows exemplary protocol stacks for various embodiments in which the F1-C and/or F1-U mapping can be configured between L2 addresses (e.g., MAC IDs) used on the respective hops between intermediate nodes. In the exemplary arrangement shown in FIG. 11, the mapping can be performed primarily by the DU but, in some embodiments, also by the intermediate IAB nodes (e.g., IAB Node 1). Similar to FIG. 10, the IP/UDP protocol headers are included in the DL packets sent from the DU to the intermediate nodes.

Figure 12:
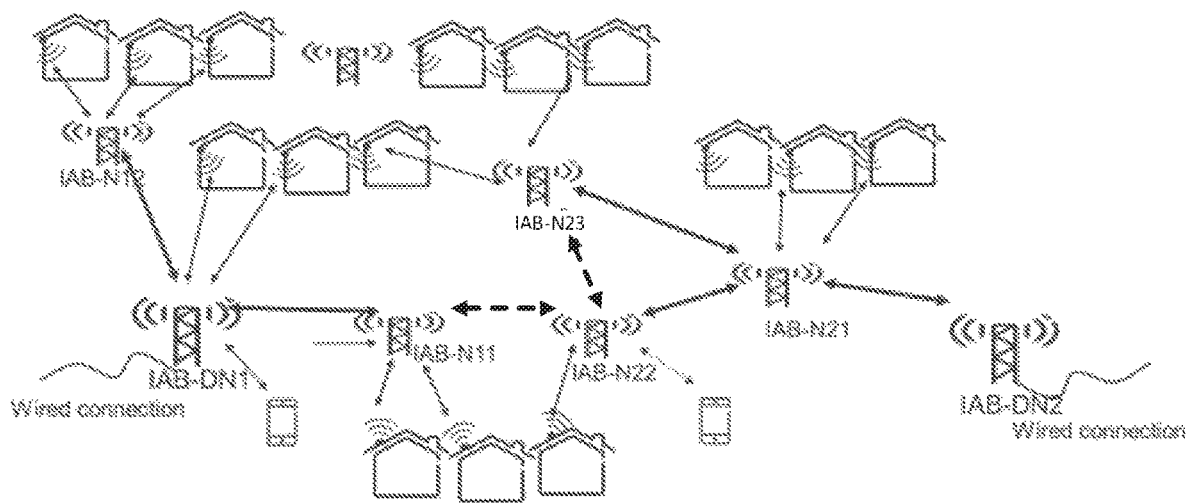
FIG. 12 shows an exemplary IAB network with multiple redundant paths, according to various embodiments of the present disclosure.

In certain multi-hop IAB network configurations, it may be necessary to support redundant paths for IAB node(s). In these configurations, certain paths could be impaired ("shadowed"), resulting in that the IAB node would need to use alternative paths to continue to serve the UEs connected to the IAB node. FIG. 12 shows an exemplary IAB network with multiple redundant paths, according to various embodiments of the present disclosure. In FIG. 12, IAB node IAB-N22 could either be backhauled by IAB-N23 or IAB-N21 under the same Donor node (IAB-DN2) or by IAB-N11 under a different Donor node (IAB-DN1).

Exemplary embodiments of the present disclosure can be utilized to configure redundant connection paths for the IAB node. In such embodiments, where the IAB nodes can be directly connected to multiple DUs or other IAB node providing backhaul functionality, the various intermediate nodes can be configure with mapping rules for different paths. The configuration can be performed by the CU and could include configurations for primary paths and fallback paths in case one path (or connection) is lost. From the CU point of view it would look like the IAB node is using Dual Connectivity (DC), a feature standardized for NR, where UE RRC and PDCP protocols are terminated in the CU while the UE RLC/MAC protocols are terminated in separate DUs.

Figure 13:
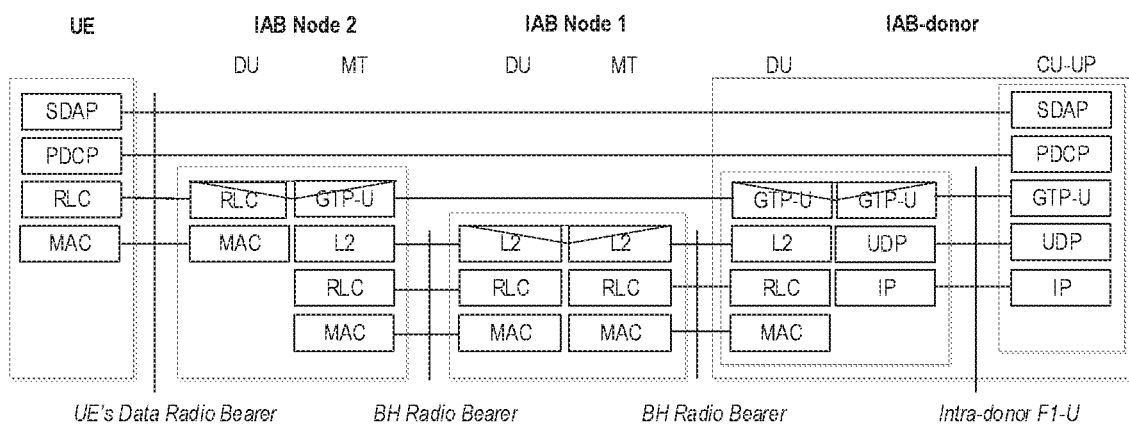
FIGS. 13-14 shows other exemplary UP protocol stacks for various exemplary embodiments in which the F1-U mapping can be performed based on a combination of IP address and GTP TEID.

FIG. 13 shows other exemplary UP protocol stacks for various embodiments in which the F1-U mapping can be performed based on a combination of IP address and GTP TEID. In the DL direction, IAB Node 2 (which provides access to the UE) is the target node for a packet arriving at the donor gNB-DU. In this scenario, the donor gNB-DU is aware of IAB Node 2's IP address. The arriving data packet is also targeted at a particular radio bearer associated with the UE, which can be identified based on the packet's GTP TEID. In this scenario, the donor gNB-DU performs a mapping between the combination of UE GTP TEID and IAB Node 2 IP address, and a particular L2 address uniquely associated with IAB Node 2 (i.e., not associated with any other intermediate nodes). The gNB-DU then sends the packet labelled with this L2 address towards IAB Node 1 over a particular backhaul (BH) radio bearer. The BH radio bearer can also be selected as part of the mapping. Upon receiving this packet, IAB Node 1 recognizes this L2 address as being associated with IAB Node 2 and, consequently, forwards the packet to IAB Node 2. Upon receiving the packet, IAB Node 2 unpacks the UE's GTP TEID and sends the packet via the associated DRB. In the UL direction, IAB Node 2 can operate in a similar manner for mapping to a L2 address associated with the donor gNB-DU.

Figure 14:
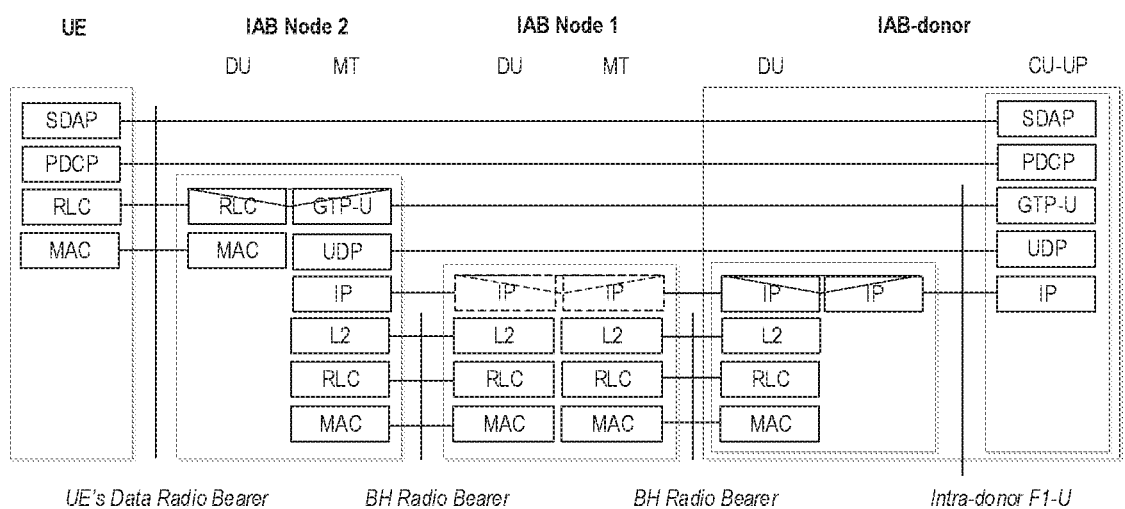

FIG. 14 illustrates shows other exemplary UP protocol stacks for various embodiments in which the F1-U mapping is also performed based on a combination of IP address and GTP TEID. In FIG. 13, only the packet GTP-U header (e.g., including the GTP TEID) was sent from the donor gNB-DU. In FIG. 14, however, the received packet's IP/UDP headers (i.e., associated with IAB Node 2) are also sent by the donor gNB-DU and forwarded by IAB Node 1. Note, however, that these headers are not changed by the gNB-DU, nor does the gNB-DU insert any IP/UDP/GTP protocol header information associated with IAB Node 1. In the UL direction, IAB Node 2 can operate in a similar manner for mapping to a L2 address associated with the donor gNB-DU.

Figure 15:
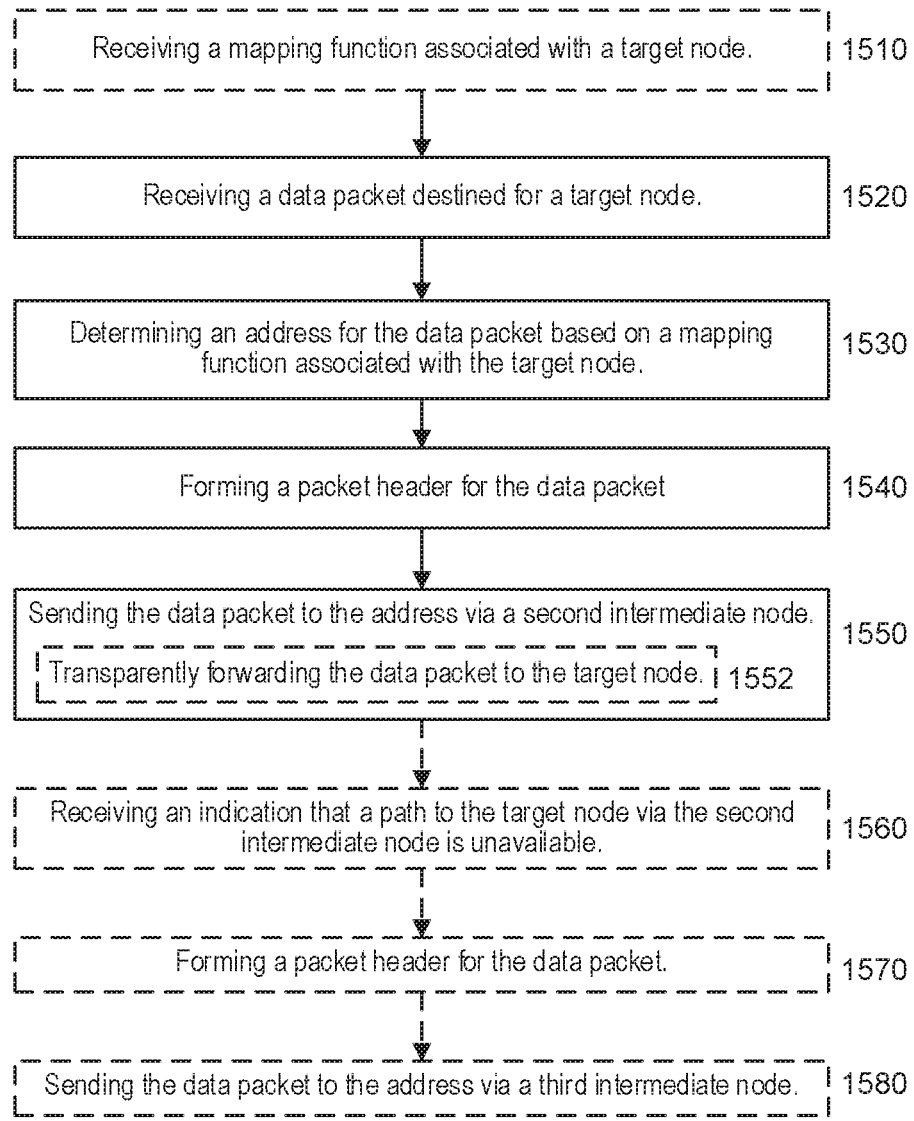
FIG. 15 shows a flow diagram for an exemplary method and/or procedure performed a first intermediate node in an IAB network, according to various embodiments of the present disclosure.

FIG. 15 illustrates an exemplary method and/or procedure performed in by an intermediate node of a multi-hop, integrated access backhaul, IAB, communication network, in accordance with particular exemplary embodiments of the present disclosure. The exemplary method and/or procedure shown in FIG. 15 can be performed, for example, by a first intermediate node (e.g., gNB-CU, gNB-DU, IAB node, base station, etc.) in communication with a target network node (e.g., IAB node, gNB-CU, base station, etc.) via a second intermediate node (e.g., gNB-DU, IAB node, base station, etc.) in the IAB network. Although the exemplary method and/or procedure is illustrated in FIG. 15 by blocks in a particular order, this order is exemplary and the operations corresponding to the blocks can be performed in different orders, and can be combined and/or divided into blocks having different functionality than shown in FIG. 15. Furthermore, exemplary method and/or procedure shown in FIG. 15 can be complimentary to other exemplary methods and/or procedures disclosed herein, such that they are capable of being used cooperatively to provide the benefits, advantages, and/or solutions to problems described hereinabove. Optional blocks are illustrated by dashed lines.

In some embodiments, the exemplary method and/or procedure can include the operations of block 1510, where the first intermediate node can receive a mapping function associated with a target node of the communication network from another network node, such as a gNB-CU. The first intermediate node can be configured to communicate with the target node via at least a second intermediate node of the communication network. The exemplary method and/or procedure can also include the operations of block 1520, where the first intermediate node can receive a data packet destined for the target node. In some embodiments, the data packet can comprise control-plane information and the mapping function can be based on at least one of the following identifying the target node: F1 Application Protocol (F1-AP) information; Stream Control Transmission Protocol (SCTP) information; and Internet Protocol (IP) information. In other embodiments, the data packet can comprise user-plane information and the mapping function can be based on at least one of the following associated with the target node: GPRS Tunneling Protocol (GTP) Tunnel Endpoint Identifier (TEID); and IP information.

The exemplary method and/or procedure can also include the operations of block 1530, where the first intermediate node can determine an address for the data packet based on a mapping function associated with the target node. For example, the mapping function can be, or can include, the mapping function received in block 1510. In some embodiments, the mapping function can comprise a relationship between one or more addresses associated with the target node and one or more radio bearers between the first and second intermediate nodes. In some embodiments, each of the one or more addresses associated with the target node can be one of the following: an IP address, a GTP TEID, and a layer-2 address.

In some embodiments, the mapping function can comprise a relationship between the address and a plurality of higher-layer protocol addresses associated only with the target node. In some embodiments, the mapping function can comprise a relationship between the address and the following: GTP TEIDs associated only with the target node; and one or more IP addresses associated only with the target node.

The exemplary method and/or procedure can also include the operations of block 1540, where the first intermediate node can form a packet header for the data packet, the packet header including the address determined in block 1530. Furthermore, forming the packet header can include at least one of the following operations: excluding one or more higher-layer protocol headers related to the second intermediate node; and incorporating without modification a portion, associated with the target node, of an existing header of the data packet. In some embodiments, the excluded one or more higher-layer protocol headers can include one or more of the following types of headers comprising addresses associated with the second intermediate node: IP, UDP, and GTP.

The exemplary method and/or procedure can also include the operations of block 1550, where the first intermediate node can send the data packet, comprising the packet header, to the address via the second intermediate node. In some embodiments, the operations of block 1550 can include the operations of sub-block 1552, in which the first intermediate node can transparently forward the data packet to the target node via a GTP tunnel through the second intermediate node.

In some embodiments, the target node can be an access node serving a UE, the first intermediate node can be a gNB-DU, the second intermediate node can be an IAB node, and the data packet can be a downlink data packet destined for the UE via the access node. In such embodiments, the data packet can be sent to the address via a radio bearer between the gNB-DU and the IAB node.

In other embodiments, the target node can be gNB-CU, the first intermediate node can be a first IAB node, the second intermediate node can be a second IAB node or a gNB-DU, and the data packet can be a uplink data packet transmitted by the UE. In such embodiments, the data packet can be sent to the address via a radio bearer between the first IAB node and the second IAB node.

In some embodiments, the exemplary method and/or procedure can include the operations of block 1560, where the first intermediate node can receive an indication that a path to the target network via the second intermediate node is unavailable. In such embodiments, the exemplary method and/or procedure can also include the operations of block 1570, where the first intermediate node can form a packet header for the data packet, the packet header including the address determined in block 1530. Forming the packet header can include at least one of the following operations: excluding one or more higher-layer protocol headers related to the third intermediate node; and incorporating without modification a portion, associated with the target node, of an existing header of the data packet. Furthermore, in such embodiments, the exemplary method and/or procedure can also include the operations of block 1580, where the first intermediate node can send the data packet, comprising the packet header, to the address via the third intermediate node.

Figure 16:
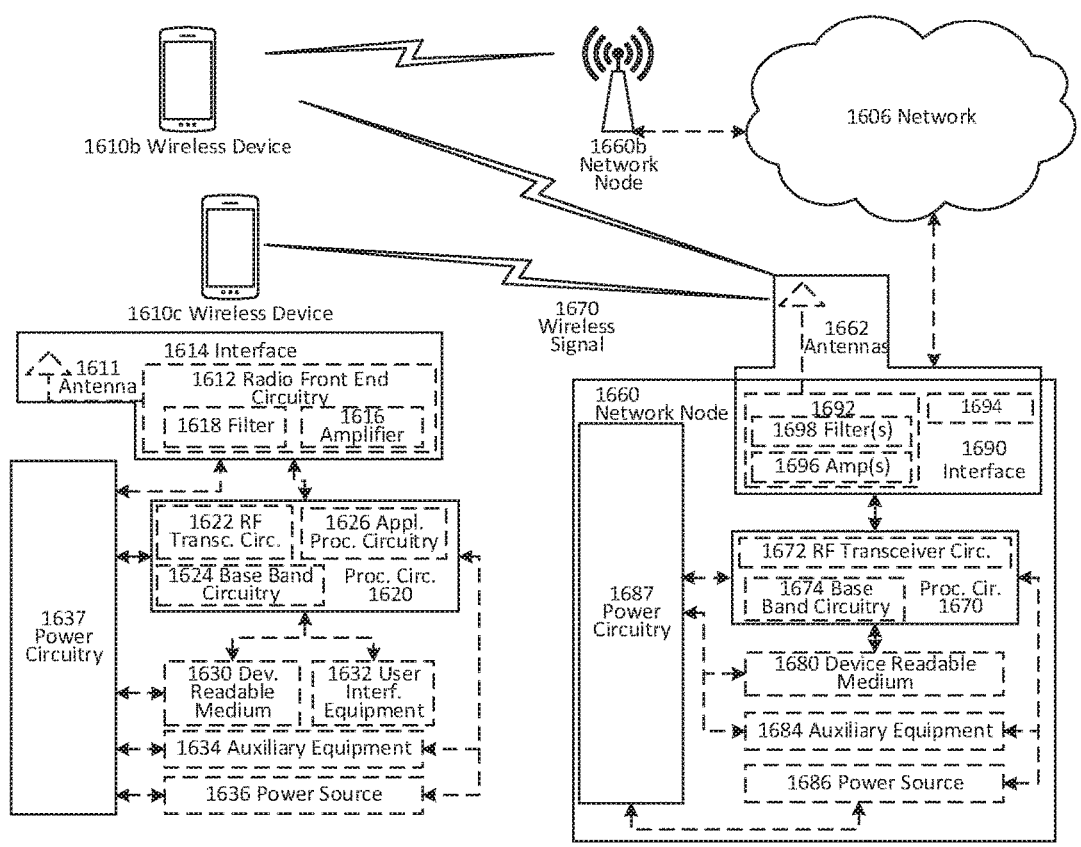
FIG. 16 is a block diagram of an exemplary wireless network configurable according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 16. For simplicity, the wireless network of FIG. 16 only depicts network 1606, network nodes 1660 and 1660*b*, and WDs 1610, 1610*b*, and 1610*c*. In practice, a wireless network can further include any additional elements suitable to support communication between wireless devices or between a wireless device and another communication device, such as a landline telephone, a service provider, or any other network node or end device. Of the illustrated components, network node 1660 and wireless device (WD) 1610 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1606 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1660 and WD 1610 comprise various components described in more detail below. These components can work together to provide network node and/or wireless device functionality, such as establishing, configuring, maintaining, and/or utilizing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 16, network node 1660 includes processing circuitry 1670, device readable medium 1680, interface 1690, auxiliary equipment 1684, power source 1686, power circuitry 1687, and antenna 1662. Although network node 1660 illustrated in the example wireless network of FIG. 16 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1660 are depicted as single boxes located within a larger box, or nested within multiple boxes, in practice, a network node can comprise multiple different physical components that make up a single illustrated component (e.g., device readable medium 1680 can comprise multiple separate hard drives as well as multiple RAM modules).

Similarly, network node 1660 can be composed of multiple physically separate components (e.g., a NodeB component and a RNC component, or a BTS component and a BSC component, etc.), which can each have their own respective components. In certain scenarios in which network node 1660 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1660 can be configured to support multiple radio access technologies (RATs). In such embodiments, some components can be duplicated (e.g., separate device readable medium 1680 for the different RATs) and some components can be reused (e.g., the same antenna 1662 can be shared by the RATs). Network node 1660 can also include multiple sets of the various illustrated components for different wireless technologies integrated into network node 1660, such as, for example, GSM, WCDMA, LTE, NR, WiFi, or Bluetooth wireless technologies. These wireless technologies can be integrated into the same or different chip or set of chips and other components within network node 1660.

Processing circuitry 1670 can be configured to perform any determining, calculating, or similar operations (e.g., certain obtaining operations) described herein as being provided by a network node. These operations performed by processing circuitry 1670 can include processing information obtained by processing circuitry 1670 by, for example, converting the obtained information into other information, comparing the obtained information or converted information to information stored in the network node, and/or performing one or more operations based on the obtained information or converted information, and as a result of said processing making a determination.

Processing circuitry 1670 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1660 components, such as device readable medium 1680, network node 1660 functionality. For example, processing circuitry 1670 can execute instructions stored in device readable medium 1680 or in memory within processing circuitry 1670. Such functionality can include providing any of the various wireless features, functions, or benefits discussed herein. In some embodiments, processing circuitry 1670 can include a system on a chip (SOC).

In some embodiments, processing circuitry 1670 can include one or more of radio frequency (RF) transceiver circuitry 1672 and baseband processing circuitry 1674. In some embodiments, radio frequency (RF) transceiver circuitry 1672 and baseband processing circuitry 1674 can be on separate chips (or sets of chips), boards, or units, such as radio units and digital units. In alternative embodiments, part or all of RF transceiver circuitry 1672 and baseband processing circuitry 1674 can be on the same chip or set of chips, boards, or units In certain embodiments, some or all of the functionality described herein as being provided by a network node, base station, eNB or other such network device can be performed by processing circuitry 1670 executing instructions stored on device readable medium 1680 or memory within processing circuitry 1670. In alternative embodiments, some or all of the functionality can be provided by processing circuitry 1670 without executing instructions stored on a separate or discrete device readable medium, such as in a hard-wired manner In any of those embodiments, whether executing instructions stored on a device readable storage medium or not, processing circuitry 1670 can be configured to perform the described functionality. The benefits provided by such functionality are not limited to processing circuitry 1670 alone or to other components of network node 1660, but are enjoyed by network node 1660 as a whole, and/or by end users and the wireless network generally.

Device readable medium 1680 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1670. Device readable medium 1680 can store any suitable instructions, data or information, including a computer program, software, an application including one or more of logic, rules, code, tables, etc. and/or other instructions capable of being executed by processing circuitry 1670 and, utilized by network node 1660. Device readable medium 1680 can be used to store any calculations made by processing circuitry 1670 and/or any data received via interface 1690. In some embodiments, processing circuitry 1670 and device readable medium 1680 can be considered to be integrated.

Interface 1690 is used in the wired or wireless communication of signalling and/or data between network node 1660, network 1606, and/or WDs 1610. As illustrated, interface 1690 comprises port(s)/terminal(s) 1694 to send and receive data, for example to and from network 1606 over a wired connection. Interface 1690 also includes radio front end circuitry 1692 that can be coupled to, or in certain embodiments a part of, antenna 1662. Radio front end circuitry 1692 comprises filters 1698 and amplifiers 1696. Radio front end circuitry 1692 can be connected to antenna 1662 and processing circuitry 1670. Radio front end circuitry can be configured to condition signals communicated between antenna 1662 and processing circuitry 1670. Radio front end circuitry 1692 can receive digital data that is to be sent out to other network nodes or WDs via a wireless connection. Radio front end circuitry 1692 can convert the digital data into a radio signal having the appropriate channel and bandwidth parameters using a combination of filters 1698 and/or amplifiers 1696. The radio signal can then be transmitted via antenna 1662. Similarly, when receiving data, antenna 1662 can collect radio signals which are then converted into digital data by radio front end circuitry 1692. The digital data can be passed to processing circuitry 1670. In other embodiments, the interface can comprise different components and/or different combinations of components.

In certain alternative embodiments, network node 1660 may not include separate radio front end circuitry 1692, instead, processing circuitry 1670 can comprise radio front end circuitry and can be connected to antenna 1662 without separate radio front end circuitry 1692. Similarly, in some embodiments, all or some of RF transceiver circuitry 1672 can be considered a part of interface 1690. In still other embodiments, interface 1690 can include one or more ports or terminals 1694, radio front end circuitry 1692, and RF transceiver circuitry 1672, as part of a radio unit (not shown), and interface 1690 can communicate with baseband processing circuitry 1674, which is part of a digital unit (not shown).

Antenna 1662 can include one or more antennas, or antenna arrays, configured to send and/or receive wireless signals. Antenna 1662 can be coupled to radio front end circuitry 1690 and can be any type of antenna capable of transmitting and receiving data and/or signals wirelessly. In some embodiments, antenna 1662 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1662 can be separate from network node 1660 and can be connectable to network node 1660 through an interface or port.

Antenna 1662, interface 1690, and/or processing circuitry 1670 can be configured to perform any receiving operations and/or certain obtaining operations described herein as being performed by a network node. Any information, data and/or signals can be received from a wireless device, another network node and/or any other network equipment. Similarly, antenna 1662, interface 1690, and/or processing circuitry 1670 can be configured to perform any transmitting operations described herein as being performed by a network node. Any information, data and/or signals can be transmitted to a wireless device, another network node and/or any other network equipment.

Power circuitry 1687 can comprise, or be coupled to, power management circuitry and can be configured to supply the components of network node 1660 with power for performing the functionality described herein. Power circuitry 1687 can receive power from power source 1686. Power source 1686 and/or power circuitry 1687 can be configured to provide power to the various components of network node 1660 in a form suitable for the respective components (e.g., at a voltage and current level needed for each respective component). Power source 1686 can either be included in, or external to, power circuitry 1687 and/or network node 1660. For example, network node 1660 can be connectable to an external power source (e.g., an electricity outlet) via an input circuitry or interface such as an electrical cable, whereby the external power source supplies power to power circuitry 1687. As a further example, power source 1686 can comprise a source of power in the form of a battery or battery pack which is connected to, or integrated in, power circuitry 1687. The battery can provide backup power should the external power source fail. Other types of power sources, such as photovoltaic devices, can also be used.

Alternative embodiments of network node 1660 can include additional components beyond those shown in FIG. 16 that can be responsible for providing certain aspects of the network node's functionality, including any of the functionality described herein and/or any functionality necessary to support the subject matter described herein. For example, network node 1660 can include user interface equipment to allow and/or facilitate input of information into network node 1660 and to allow and/or facilitate output of information from network node 1660. This can allow and/or facilitate a user to perform diagnostic, maintenance, repair, and other administrative functions for network node 1660.

As used herein, wireless device (WD) refers to a device capable, configured, arranged and/or operable to communicate wirelessly with network nodes and/or other wireless devices. Unless otherwise noted, the term WD can be used interchangeably herein with user equipment (UE). Communicating wirelessly can involve transmitting and/or receiving wireless signals using electromagnetic waves, radio waves, infrared waves, and/or other types of signals suitable for conveying information through air. In some embodiments, a WD can be configured to transmit and/or receive information without direct human interaction. For instance, a WD can be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1610 includes antenna 1611, interface 1614, processing circuitry 1620, device readable medium 1630, user interface equipment 1632, auxiliary equipment 1634, power source 1636 and power circuitry 1637. WD 1610 can include multiple sets of one or more of the illustrated components for different wireless technologies supported by WD 1610, such as, for example, GSM, WCDMA, LTE, NR, WiFi, WiMAX, or Bluetooth wireless technologies, just to mention a few. These wireless technologies can be integrated into the same or different chips or set of chips as other components within WD 1610.

Antenna 1611 can include one or more antennas or antenna arrays, configured to send and/or receive wireless signals, and is connected to interface 1614. In certain alternative embodiments, antenna 1611 can be separate from WD 1610 and be connectable to WD 1610 through an interface or port. Antenna 1611, interface 1614, and/or processing circuitry 1620 can be configured to perform any receiving or transmitting operations described herein as being performed by a WD. Any information, data and/or signals can be received from a network node and/or another WD. In some embodiments, radio front end circuitry and/or antenna 1611 can be considered an interface.

As illustrated, interface 1614 comprises radio front end circuitry 1612 and antenna 1611. Radio front end circuitry 1612 comprise one or more filters 1618 and amplifiers 1616. Radio front end circuitry 1614 is connected to antenna 1611 and processing circuitry 1620, and can be configured to condition signals communicated between antenna 1611 and processing circuitry 1620. Radio front end circuitry 1612 can be coupled to or a part of antenna 1611. In some embodiments, WD 1610 may not include separate radio front end circuitry 1612; rather, processing circuitry 1620 can comprise radio front end circuitry and can be connected to antenna 1611. Similarly, in some embodiments, some or all of RF transceiver circuitry 1622 can be considered a part of interface 1614. Radio front end circuitry 1612 can receive digital data that is to be sent out to other network nodes or WDs via a wireless connection. Radio front end circuitry 1612 can convert the digital data into a radio signal having the appropriate channel and bandwidth parameters using a combination of filters 1618 and/or amplifiers 1616. The radio signal can then be transmitted via antenna 1611. Similarly, when receiving data, antenna 1611 can collect radio signals which are then converted into digital data by radio front end circuitry 1612. The digital data can be passed to processing circuitry 1620. In other embodiments, the interface can comprise different components and/or different combinations of components.

Processing circuitry 1620 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1610 components, such as device readable medium 1630, WD 1610 functionality. Such functionality can include providing any of the various wireless features or benefits discussed herein. For example, processing circuitry 1620 can execute instructions stored in device readable medium 1630 or in memory within processing circuitry 1620 to provide the functionality disclosed herein.

As illustrated, processing circuitry 1620 includes one or more of RF transceiver circuitry 1622, baseband processing circuitry 1624, and application processing circuitry 1626. In other embodiments, the processing circuitry can comprise different components and/or different combinations of components. In certain embodiments processing circuitry 1620 of WD 1610 can comprise a SOC. In some embodiments, RF transceiver circuitry 1622, baseband processing circuitry 1624, and application processing circuitry 1626 can be on separate chips or sets of chips. In alternative embodiments, part or all of baseband processing circuitry 1624 and application processing circuitry 1626 can be combined into one chip or set of chips, and RF transceiver circuitry 1622 can be on a separate chip or set of chips. In still alternative embodiments, part or all of RF transceiver circuitry 1622 and baseband processing circuitry 1624 can be on the same chip or set of chips, and application processing circuitry 1626 can be on a separate chip or set of chips. In yet other alternative embodiments, part or all of RF transceiver circuitry 1622, baseband processing circuitry 1624, and application processing circuitry 1626 can be combined in the same chip or set of chips. In some embodiments, RF transceiver circuitry 1622 can be a part of interface 1614. RF transceiver circuitry 1622 can condition RF signals for processing circuitry 1620.

In certain embodiments, some or all of the functionality described herein as being performed by a WD can be provided by processing circuitry 1620 executing instructions stored on device readable medium 1630, which in certain embodiments can be a computer-readable storage medium. In alternative embodiments, some or all of the functionality can be provided by processing circuitry 1620 without executing instructions stored on a separate or discrete device readable storage medium, such as in a hard-wired manner In any of those particular embodiments, whether executing instructions stored on a device readable storage medium or not, processing circuitry 1620 can be configured to perform the described functionality. The benefits provided by such functionality are not limited to processing circuitry 1620 alone or to other components of WD 1610, but are enjoyed by WD 1610 as a whole, and/or by end users and the wireless network generally.

Processing circuitry 1620 can be configured to perform any determining, calculating, or similar operations (e.g., certain obtaining operations) described herein as being performed by a WD. These operations, as performed by processing circuitry 1620, can include processing information obtained by processing circuitry 1620 by, for example, converting the obtained information into other information, comparing the obtained information or converted information to information stored by WD 1610, and/or performing one or more operations based on the obtained information or converted information, and as a result of said processing making a determination.

Device readable medium 1630 can be operable to store a computer program, software, an application including one or more of logic, rules, code, tables, etc. and/or other instructions capable of being executed by processing circuitry 1620. Device readable medium 1630 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1620. In some embodiments, processing circuitry 1620 and device readable medium 1630 can be considered to be integrated.

User interface equipment 1632 can include components that allow and/or facilitate a human user to interact with WD 1610. Such interaction can be of many forms, such as visual, audial, tactile, etc. User interface equipment 1632 can be operable to produce output to the user and to allow and/or facilitate the user to provide input to WD 1610. The type of interaction can vary depending on the type of user interface equipment 1632 installed in WD 1610. For example, if WD 1610 is a smart phone, the interaction can be via a touch screen; if WD 1610 is a smart meter, the interaction can be through a screen that provides usage (e.g., the number of gallons used) or a speaker that provides an audible alert (e.g., if smoke is detected). User interface equipment 1632 can include input interfaces, devices and circuits, and output interfaces, devices and circuits. User interface equipment 1632 can be configured to allow and/or facilitate input of information into WD 1610, and is connected to processing circuitry 1620 to allow and/or facilitate processing circuitry 1620 to process the input information. User interface equipment 1632 can include, for example, a microphone, a proximity or other sensor, keys/buttons, a touch display, one or more cameras, a USB port, or other input circuitry. User interface equipment 1632 is also configured to allow and/or facilitate output of information from WD 1610, and to allow and/or facilitate processing circuitry 1620 to output information from WD 1610. User interface equipment 1632 can include, for example, a speaker, a display, vibrating circuitry, a USB port, a headphone interface, or other output circuitry. Using one or more input and output interfaces, devices, and circuits, of user interface equipment 1632, WD 1610 can communicate with end users and/or the wireless network, and allow and/or facilitate them to benefit from the functionality described herein.

Auxiliary equipment 1634 is operable to provide more specific functionality which may not be generally performed by WDs. This can comprise specialized sensors for doing measurements for various purposes, interfaces for additional types of communication such as wired communications etc. The inclusion and type of components of auxiliary equipment 1634 can vary depending on the embodiment and/or scenario.

Power source 1636 can, in some embodiments, be in the form of a battery or battery pack. Other types of power sources, such as an external power source (e.g., an electricity outlet), photovoltaic devices or power cells, can also be used. WD 1610 can further comprise power circuitry 1637 for delivering power from power source 1636 to the various parts of WD 1610 which need power from power source 1636 to carry out any functionality described or indicated herein. Power circuitry 1637 can in certain embodiments comprise power management circuitry. Power circuitry 1637 can additionally or alternatively be operable to receive power from an external power source; in which case WD 1610 can be connectable to the external power source (such as an electricity outlet) via input circuitry or an interface such as an electrical power cable. Power circuitry 1637 can also in certain embodiments be operable to deliver power from an external power source to power source 1636. This can be, for example, for the charging of power source 1636. Power circuitry 1637 can perform any converting or other modification to the power from power source 1636 to make it suitable for supply to the respective components of WD 1610.

Figure 17:
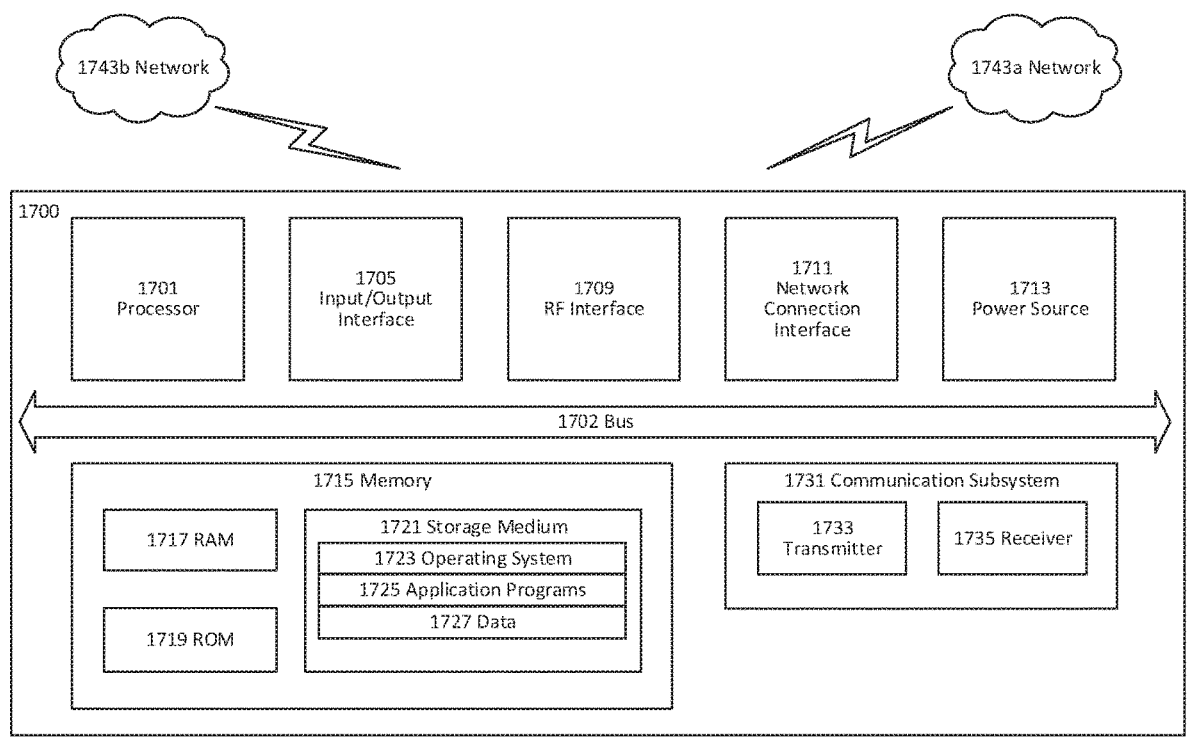
FIG. 17 is a block diagram of an exemplary user equipment (UE) configurable according to various exemplary embodiments of the present disclosure.

FIG. 17 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 17200 can be any UE identified by the 3$^{rd}$ Generation Partnership Project (3GPP), including a NB-IoT UE, a machine type communication (MTC) UE, and/or an enhanced MTC (eMTC) UE. UE 1700, as illustrated in FIG. 17, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE can be used interchangeable. Accordingly, although FIG. 17 is a UE, the components discussed herein are equally applicable to a WD, and vice-versa.

In FIG. 17, UE 1700 includes processing circuitry 1701 that is operatively coupled to input/output interface 1705, radio frequency (RF) interface 1709, network connection interface 1711, memory 1715 including random access memory (RAM) 1717, read-only memory (ROM) 1719, and storage medium 1721 or the like, communication subsystem 1731, power source 1733, and/or any other component, or any combination thereof. Storage medium 1721 includes operating system 1723, application program 1725, and data 1727. In other embodiments, storage medium 1721 can include other similar types of information. Certain UEs can utilize all of the components shown in FIG. 17, or only a subset of the components. The level of integration between the components can vary from one UE to another UE. Further, certain UEs can contain multiple instances of a component, such as multiple processors, memories, transceivers, transmitters, receivers, etc.

In FIG. 17, processing circuitry 1701 can be configured to process computer instructions and data. Processing circuitry 1701 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1701 can include two central processing units (CPUs). Data can be information in a form suitable for use by a computer.

In the depicted embodiment, input/output interface 1705 can be configured to provide a communication interface to an input device, output device, or input and output device. UE 1700 can be configured to use an output device via input/output interface 1705. An output device can use the same type of interface port as an input device. For example, a USB port can be used to provide input to and output from UE 1700. The output device can be a speaker, a sound card, a video card, a display, a monitor, a printer, an actuator, an emitter, a smartcard, another output device, or any combination thereof. UE 1700 can be configured to use an input device via input/output interface 1705 to allow and/or facilitate a user to capture information into UE 1700. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 17, RF interface 1709 can be configured to provide a communication interface to RF components such as a transmitter, a receiver, and an antenna. Network connection interface 1711 can be configured to provide a communication interface to network 1743a. Network 1743a can encompass wired and/or wireless networks such as a local-area network (LAN), a wide-area network (WAN), a computer network, a wireless network, a telecommunications network, another like network or any combination thereof. For example, network 1743a can comprise a Wi-Fi network. Network connection interface 1711 can be configured to include a receiver and a transmitter interface used to communicate with one or more other devices over a communication network according to one or more communication protocols, such as Ethernet, TCP/IP, SONET, ATM, or the like. Network connection interface 1711 can implement receiver and transmitter functionality appropriate to the communication network links (e.g., optical, electrical, and the like). The transmitter and receiver functions can share circuit components, software or firmware, or alternatively can be implemented separately.

RAM 1717 can be configured to interface via bus 1702 to processing circuitry 1701 to provide storage or caching of data or computer instructions during the execution of software programs such as the operating system, application programs, and device drivers. ROM 1719 can be configured to provide computer instructions or data to processing circuitry 1701. For example, ROM 1719 can be configured to store invariant low-level system code or data for basic system functions such as basic input and output (I/O), startup, or reception of keystrokes from a keyboard that are stored in a non-volatile memory. Storage medium 1721 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1721 can be configured to include operating system 1723, application program 1725 such as a web browser application, a widget or gadget engine or another application, and data file 1727. Storage medium 1721 can store, for use by UE 1700, any of a variety of various operating systems or combinations of operating systems.

Storage medium 1721 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1721 can allow and/or facilitate UE 1700 to access computer-executable instructions, application programs or the like, stored on transitory or non-transitory memory media, to off-load data, or to upload data. An article of manufacture, such as one utilizing a communication system can be tangibly embodied in storage medium 1721, which can comprise a device readable medium.

In FIG. 17, processing circuitry 1701 can be configured to communicate with network 1743b using communication subsystem 1731. Network 1743a and network 1743b can be the same network or networks or different network or networks. Communication subsystem 1731 can be configured to include one or more transceivers used to communicate with network 1743b. For example, communication subsystem 1731 can be configured to include one or more transceivers used to communicate with one or more remote transceivers of another device capable of wireless communication such as another WD, UE, or base station of a radio access network (RAN) according to one or more communication protocols, such as IEEE 802.17, CDMA, WCDMA, GSM, LTE, UTRAN, WiMax, or the like. Each transceiver can include transmitter 1733 and/or receiver 1735 to implement transmitter or receiver functionality, respectively, appropriate to the RAN links (e.g., frequency allocations and the like). Further, transmitter 1733 and receiver 1735 of each transceiver can share circuit components, software or firmware, or alternatively can be implemented separately.

In the illustrated embodiment, the communication functions of communication subsystem 1731 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1731 can include cellular communication, Wi-Fi communication, Bluetooth communication, and GPS communication. Network 1743b can encompass wired and/or wireless networks such as a local-area network (LAN), a wide-area network (WAN), a computer network, a wireless network, a telecommunications network, another like network or any combination thereof. For example, network 1743b can be a cellular network, a Wi-Fi network, and/or a near-field network. Power source 1713 can be configured to provide alternating current (AC) or direct current (DC) power to components of UE 1700.

The features, benefits and/or functions described herein can be implemented in one of the components of UE 1700 or partitioned across multiple components of UE 1700. Further, the features, benefits, and/or functions described herein can be implemented in any combination of hardware, software or firmware. In one example, communication subsystem 1731 can be configured to include any of the components described herein. Further, processing circuitry 1701 can be configured to communicate with any of such components over bus 1702. In another example, any of such components can be represented by program instructions stored in memory that when executed by processing circuitry 1701 perform the corresponding functions described herein. In another example, the functionality of any of such components can be partitioned between processing circuitry 1701 and communication subsystem 1731. In another example, the non-computationally intensive functions of any of such components can be implemented in software or firmware and the computationally intensive functions can be implemented in hardware.

Figure 18:
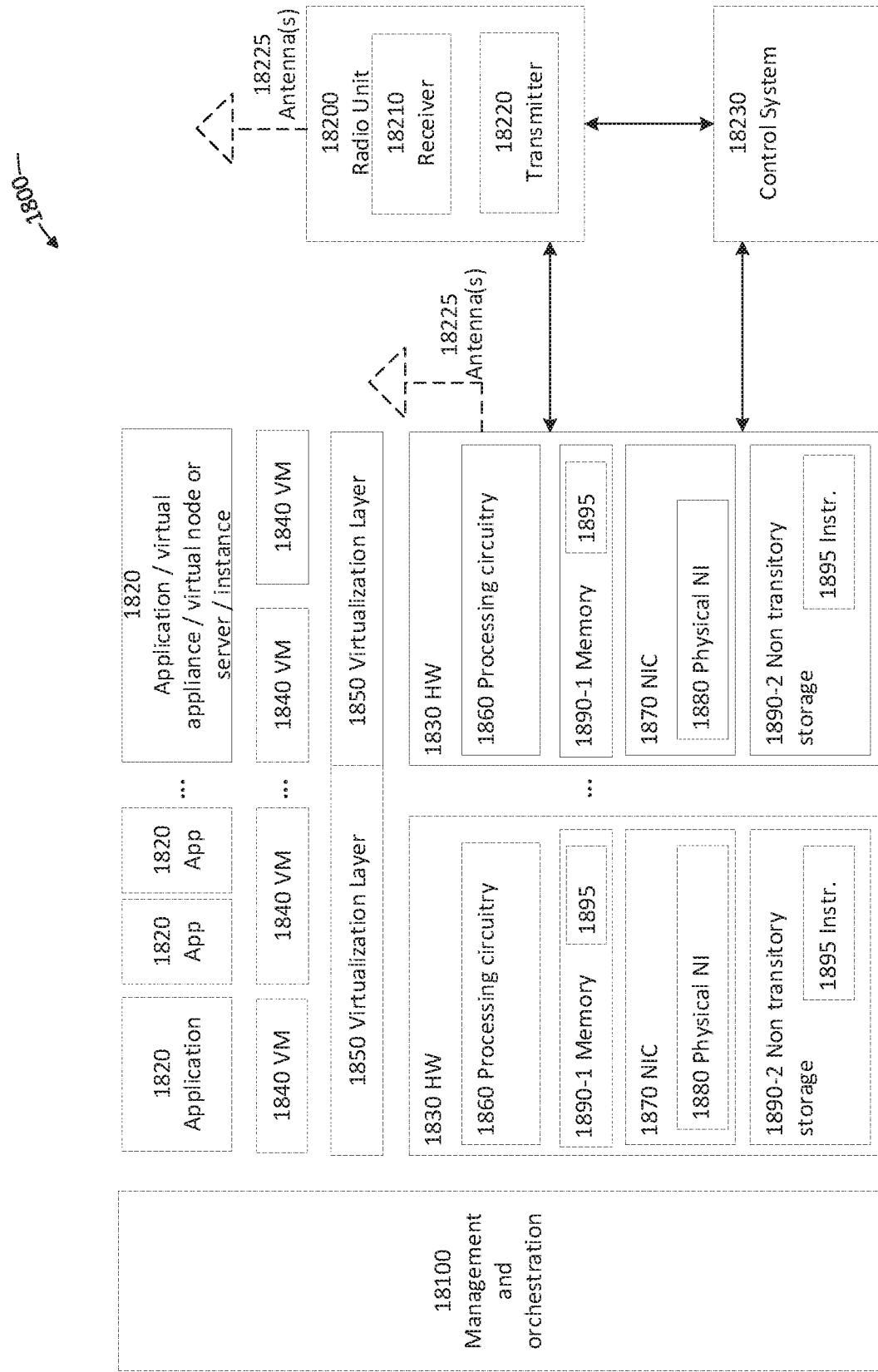
FIG. 18 is a block diagram of illustrating a virtualization environment that can facilitate virtualization of various functions implemented according to various exemplary embodiments of the present disclosure.

FIG. 18 is a schematic block diagram illustrating a virtualization environment 1800 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1800 hosted by one or more of hardware nodes 1830. Further, in embodiments in which the virtual node is not a radio access node or does not require radio connectivity (e.g., a core network node), then the network node can be entirely virtualized.

The functions can be implemented by one or more applications 1820 (which can alternatively be called software instances, virtual appliances, network functions, virtual nodes, virtual network functions, etc.) operative to implement some of the features, functions, and/or benefits of some of the embodiments disclosed herein. Applications 1820 are run in virtualization environment 1800 which provides hardware 1830 comprising processing circuitry 1860 and memory 1890. Memory 1890 contains instructions 1895 executable by processing circuitry 1860 whereby application 1820 is operative to provide one or more of the features, benefits, and/or functions disclosed herein.

Virtualization environment 1800, comprises general-purpose or special-purpose network hardware devices 1830 comprising a set of one or more processors or processing circuitry 1860, which can be commercial off-the-shelf (COTS) processors, dedicated Application Specific Integrated Circuits (ASICs), or any other type of processing circuitry including digital or analog hardware components or special purpose processors. Each hardware device can comprise memory 1890-1 which can be non-persistent memory for temporarily storing instructions 1895 or software executed by processing circuitry 1860. Each hardware device can comprise one or more network interface controllers (NICs) 1870, also known as network interface cards, which include physical network interface 1880. Each hardware device can also include non-transitory, persistent, machine-readable storage media 1890-2 having stored therein software 1895 and/or instructions executable by processing circuitry 1860. Software 1895 can include any type of software including software for instantiating one or more virtualization layers 1850 (also referred to as hypervisors), software to execute virtual machines 1840 as well as software allowing it to execute functions, features and/or benefits described in relation with some embodiments described herein.

Virtual machines 1840, comprise virtual processing, virtual memory, virtual networking or interface and virtual storage, and can be run by a corresponding virtualization layer 1850 or hypervisor. Different embodiments of the instance of virtual appliance 1820 can be implemented on one or more of virtual machines 1840, and the implementations can be made in different ways.

During operation, processing circuitry 1860 executes software 1895 to instantiate the hypervisor or virtualization layer 1850, which can sometimes be referred to as a virtual machine monitor (VMM). Virtualization layer 1850 can present a virtual operating platform that appears like networking hardware to virtual machine 1840.

As shown in FIG. 18, hardware 1830 can be a standalone network node with generic or specific components. Hardware 1830 can comprise antenna 18225 and can implement some functions via virtualization. Alternatively, hardware 1830 can be part of a larger cluster of hardware (e.g., such as in a data center or customer premise equipment (CPE)) where many hardware nodes work together and are managed via management and orchestration (MANO) 18100, which, among others, oversees lifecycle management of applications 1820.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1840 can be a software implementation of a physical machine that runs programs as if they were executing on a physical, non-virtualized machine. Each of virtual machines 1840, and that part of hardware 1830 that executes that virtual machine, be it hardware dedicated to that virtual machine and/or hardware shared by that virtual machine with others of the virtual machines 1840, forms a separate virtual network elements (VNE).

Still in the context of NFV, Virtual Network Function (VNF) is responsible for handling specific network functions that run in one or more virtual machines 1840 on top of hardware networking infrastructure 1830 and corresponds to application 1820 in FIG. 18.

In some embodiments, one or more radio units 18200 that each include one or more transmitters 18220 and one or more receivers 18210 can be coupled to one or more antennas 18225. Radio units 18200 can communicate directly with hardware nodes 1830 via one or more appropriate network interfaces and can be used in combination with the virtual components to provide a virtual node with radio capabilities, such as a radio access node or a base station.

In some embodiments, some signalling can be effected with the use of control system 18230 which can alternatively be used for communication between the hardware nodes 1830 and radio units 18200.

Figure 19:
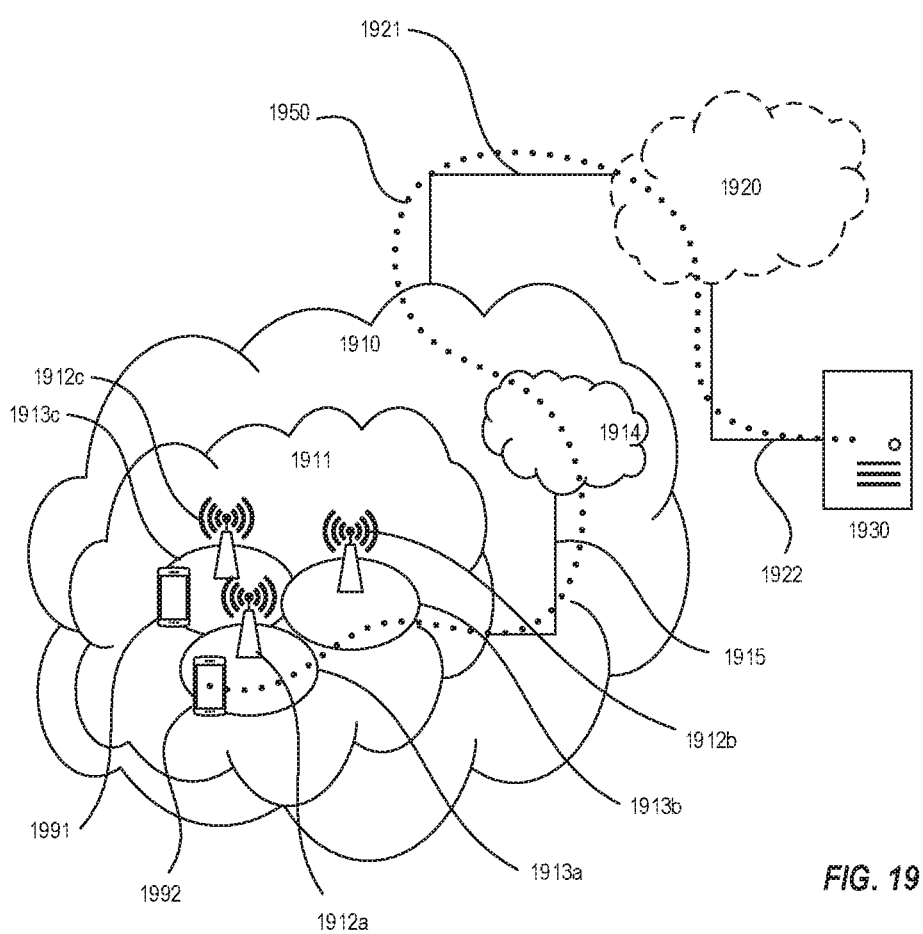
FIGS. 19-20 are block diagrams of exemplary communication systems configurable according to various exemplary embodiments of the present disclosure.

With reference to FIG. 19, in accordance with an embodiment, a communication system includes telecommunication network 1910, such as a 3GPP-type cellular network, which comprises access network 1911, such as a radio access network, and core network 1914. Access network 1911 comprises a plurality of base stations 1912a, 1912b, 1912c, such as NBs, eNBs, gNBs or other types of wireless access points, each defining a corresponding coverage area 1913a, 1913b, 1913c. Each base station 1912a, 1912b, 1912c is connectable to core network 1914 over a wired or wireless connection 1915. A first UE 1991 located in coverage area 1913c can be configured to wirelessly connect to, or be paged by, the corresponding base station 1912c. A second UE 1992 in coverage area 1913a is wirelessly connectable to the corresponding base station 1912a. While a plurality of UEs 1991, 1992 are illustrated in this example, the disclosed embodiments are equally applicable to a situation where a sole UE is in the coverage area or where a sole UE is connecting to the corresponding base station 1912.

Telecommunication network 1910 is itself connected to host computer 1930, which can be embodied in the hardware and/or software of a standalone server, a cloud-implemented server, a distributed server or as processing resources in a server farm. Host computer 1930 can be under the ownership or control of a service provider, or can be operated by the service provider or on behalf of the service provider. Connections 1921 and 1922 between telecommunication network 1910 and host computer 1930 can extend directly from core network 1914 to host computer 1930 or can go via an optional intermediate network 1920. Intermediate network 1920 can be one of, or a combination of more than one of, a public, private or hosted network; intermediate network 1920, if any, can be a backbone network or the Internet; in particular, intermediate network 1920 can comprise two or more sub-networks (not shown).

The communication system of FIG. 19 as a whole enables connectivity between the connected UEs 1991, 1992 and host computer 1930. The connectivity can be described as an over-the-top (OTT) connection 1950. Host computer 1930 and the connected UEs 1991, 1992 are configured to communicate data and/or signaling via OTT connection 1950, using access network 1911, core network 1914, any intermediate network 1920 and possible further infrastructure (not shown) as intermediaries. OTT connection 1950 can be transparent in the sense that the participating communication devices through which OTT connection 1950 passes are unaware of routing of uplink and downlink communications. For example, base station 1912 may not or need not be informed about the past routing of an incoming downlink communication with data originating from host computer 1930 to be forwarded (e.g., handed over) to a connected UE 1991. Similarly, base station 1912 need not be aware of the future routing of an outgoing uplink communication originating from the UE 1991 towards the host computer 1930.

Example implementations, in accordance with an embodiment, of the UE, base station and host computer discussed in the preceding paragraphs will now be described with reference to FIG. 20. In communication system 2000, host computer 2010 comprises hardware 2015 including communication interface 2016 configured to set up and maintain a wired or wireless connection with an interface of a different communication device of communication system 2000. Host computer 2010 further comprises processing circuitry 2018, which can have storage and/or processing capabilities. In particular, processing circuitry 2018 can comprise one or more programmable processors, application-specific integrated circuits, field programmable gate arrays or combinations of these (not shown) adapted to execute instructions. Host computer 2010 further comprises software 2011, which is stored in or accessible by host computer 2010 and executable by processing circuitry 2018. Software 2011 includes host application 2012. Host application 2012 can be operable to provide a service to a remote user, such as UE 2030 connecting via OTT connection 2050 terminating at UE 2030 and host computer 2010. In providing the service to the remote user, host application 2012 can provide user data which is transmitted using OTT connection 2050.

Communication system 2000 can also include base station 2020 provided in a telecommunication system and comprising hardware 2025 enabling it to communicate with host computer 2010 and with UE 2030. Hardware 2025 can include communication interface 2026 for setting up and maintaining a wired or wireless connection with an interface of a different communication device of communication system 2000, as well as radio interface 2027 for setting up and maintaining at least wireless connection 2070 with UE 2030 located in a coverage area (not shown in FIG. 20) served by base station 2020. Communication interface 2026 can be configured to facilitate connection 2060 to host computer 2010. Connection 2060 can be direct or it can pass through a core network (not shown in FIG. 20) of the telecommunication system and/or through one or more intermediate networks outside the telecommunication system. In the embodiment shown, hardware 2025 of base station 2020 can also include processing circuitry 2028, which can comprise one or more programmable processors, application-specific integrated circuits, field programmable gate arrays or combinations of these (not shown) adapted to execute instructions. Base station 2020 further has software 2021 stored internally or accessible via an external connection.

Communication system 2000 can also include UE 2030 already referred to. Its hardware 2035 can include radio interface 2037 configured to set up and maintain wireless connection 2070 with a base station serving a coverage area in which UE 2030 is currently located. Hardware 2035 of UE 2030 can also include processing circuitry 2038, which can comprise one or more programmable processors, application-specific integrated circuits, field programmable gate arrays or combinations of these (not shown) adapted to execute instructions. UE 2030 further comprises software 2031, which is stored in or accessible by UE 2030 and executable by processing circuitry 2038. Software 2031 includes client application 2032. Client application 2032 can be operable to provide a service to a human or non-human user via UE 2030, with the support of host computer 2010. In host computer 2010, an executing host application 2012 can communicate with the executing client application 2032 via OTT connection 2050 terminating at UE 2030 and host computer 2010. In providing the service to the user, client application 2032 can receive request data from host application 2012 and provide user data in response to the request data. OTT connection 2050 can transfer both the request data and the user data. Client application 2032 can interact with the user to generate the user data that it provides.

Figure 20:
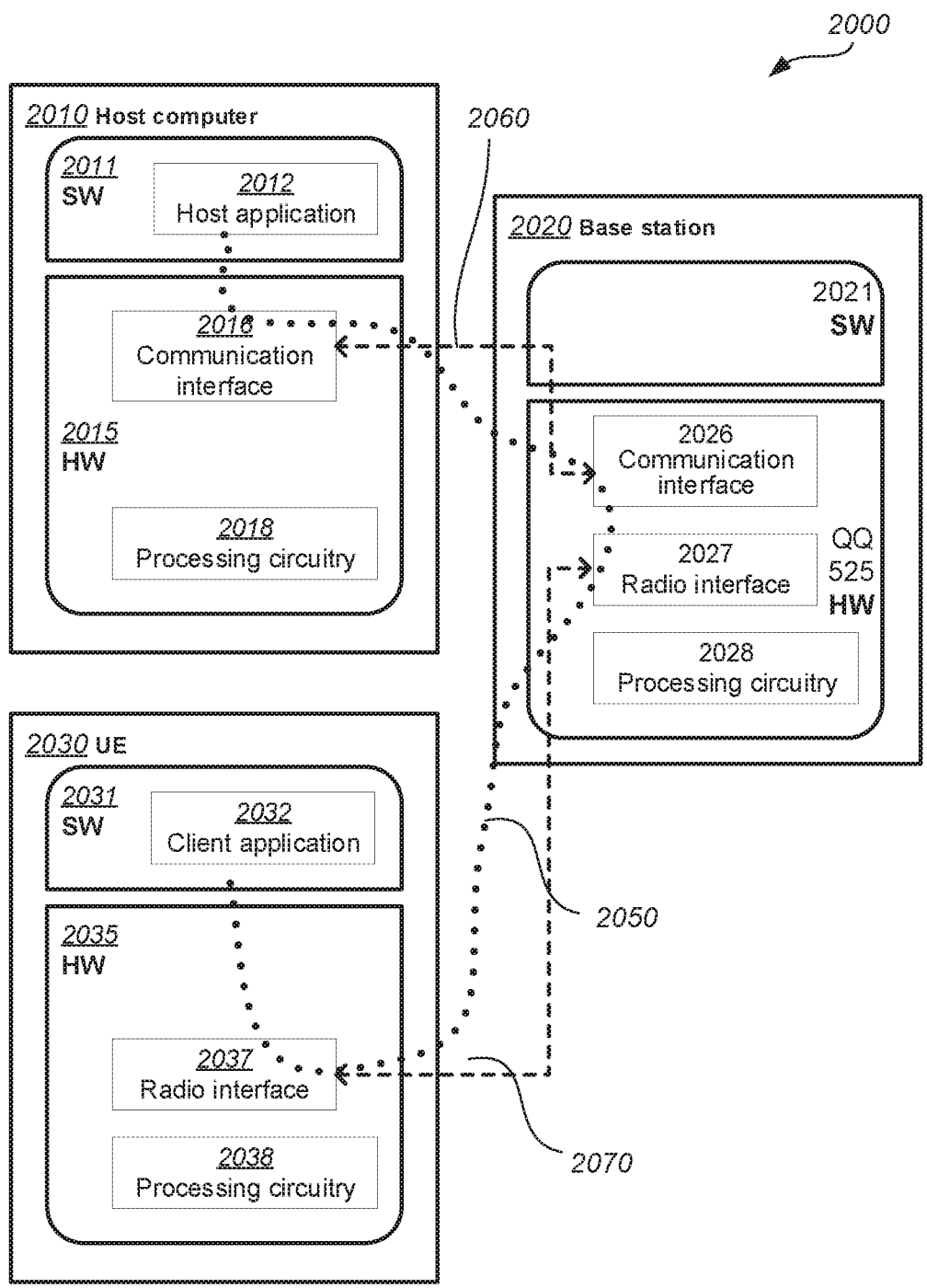

It is noted that host computer 2010, base station 2020 and UE 2030 illustrated in FIG. 20 can be similar or identical to host computer 1930, one of base stations 1912a, 1912b, 1912c and one of UEs 1991, 1992 of FIG. 19, respectively. This is to say, the inner workings of these entities can be as shown in FIG. 20 and independently, the surrounding network topology can be that of FIG. 19.

In FIG. 20, OTT connection 2050 has been drawn abstractly to illustrate the communication between host computer 2010 and UE 2030 via base station 2020, without explicit reference to any intermediary devices and the precise routing of messages via these devices. Network infrastructure can determine the routing, which it can be configured to hide from UE 2030 or from the service provider operating host computer 2010, or both. While OTT connection 2050 is active, the network infrastructure can further take decisions by which it dynamically changes the routing (e.g., on the basis of load balancing consideration or reconfiguration of the network).

Wireless connection 2070 between UE 2030 and base station 2020 is in accordance with the teachings of the embodiments described throughout this disclosure. One or more of the various embodiments improve the performance of OTT services provided to UE 2030 using OTT connection 2050, in which wireless connection 2070 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 2050 between host computer 2010 and UE 2030, in response to variations in the measurement results. The measurement procedure and/or the network functionality for reconfiguring OTT connection 2050 can be implemented in software 2011 and hardware 2015 of host computer 2010 or in software 2031 and hardware 2035 of UE 2030, or both. In embodiments, sensors (not shown) can be deployed in or in association with communication devices through which OTT connection 2050 passes; the sensors can participate in the measurement procedure by supplying values of the monitored quantities exemplified above, or supplying values of other physical quantities from which software 2011, 2031 can compute or estimate the monitored quantities. The reconfiguring of OTT connection 2050 can include message format, retransmission settings, preferred routing etc.; the reconfiguring need not affect base station 2020, and it can be unknown or imperceptible to base station 2020. Such procedures and functionalities can be known and practiced in the art. In certain embodiments, measurements can involve proprietary UE signaling facilitating host computer 2010's measurements of throughput, propagation times, latency and the like. The measurements can be implemented in that software 2011 and 2031 causes messages to be transmitted, in particular empty or 'dummy' messages, using OTT connection 2050 while it monitors propagation times, errors etc.

FIG. 21 is a flowchart illustrating an exemplary method and/or procedure implemented in a communication system, in accordance with one embodiment. The communication system includes a host computer, a base station and a UE which, in some exemplary embodiments, can be those described with reference to FIGS. 19 and 20. For simplicity of the present disclosure, only drawing references to FIG. 21 will be included in this section. In step 2110, the host computer provides user data. In substep 2111 (which can be optional) of step 2110, the host computer provides the user data by executing a host application. In step 2120, the host computer initiates a transmission carrying the user data to the UE. In step 2130 (which can be optional), the base station transmits to the UE the user data which was carried in the transmission that the host computer initiated, in accordance with the teachings of the embodiments described throughout this disclosure. In step 2140 (which can also be optional), the UE executes a client application associated with the host application executed by the host computer.

FIG. 22 is a flowchart illustrating an exemplary method and/or procedure implemented in a communication system, in accordance with one embodiment. The communication system includes a host computer, a base station and a UE which can be those described with reference to FIGS. 19 and 20. For simplicity of the present disclosure, only drawing references to FIG. 22 will be included in this section. In step 2210 of the method, the host computer provides user data. In an optional substep (not shown) the host computer provides the user data by executing a host application. In step 2220, the host computer initiates a transmission carrying the user data to the UE. The transmission can pass via the base station, in accordance with the teachings of the embodiments described throughout this disclosure. In step 2230 (which can be optional), the UE receives the user data carried in the transmission.

FIG. 23 is a flowchart illustrating an exemplary method and/or procedure implemented in a communication system, in accordance with one embodiment. The communication system includes a host computer, a base station and a UE which can be those described with reference to FIGS. 19 and 20. For simplicity of the present disclosure, only drawing references to FIG. 23 will be included in this section. In step 2310 (which can be optional), the UE receives input data provided by the host computer. Additionally or alternatively, in step 2320, the UE provides user data. In substep 2321 (which can be optional) of step 2320, the UE provides the user data by executing a client application. In substep 2311 (which can be optional) of step 2310, the UE executes a client application which provides the user data in reaction to the received input data provided by the host computer. In providing the user data, the executed client application can further consider user input received from the user. Regardless of the specific manner in which the user data was provided, the UE initiates, in substep 2330 (which can be optional), transmission of the user data to the host computer. In step 2340 of the method, the host computer receives the user data transmitted from the UE, in accordance with the teachings of the embodiments described throughout this disclosure.

FIG. 24 is a flowchart illustrating an exemplary method and/or procedure implemented in a communication system, in accordance with one embodiment. The communication system includes a host computer, a base station and a UE which can be those described with reference to FIGS. 19 and 20. For simplicity of the present disclosure, only drawing references to FIG. 24 will be included in this section. In step 2410 (which can be optional), in accordance with the teachings of the embodiments described throughout this disclosure, the base station receives user data from the UE. In step 2420 (which can be optional), the base station initiates transmission of the received user data to the host computer. In step 2430 (which can be optional), the host computer receives the user data carried in the transmission initiated by the base station.

The term unit can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Exemplary embodiments include, but are not limited to, the following enumerated embodiments:

1. A method performed at a first intermediate node of a multi-hop, integrated access backhaul (IAB) communication network, the method comprising:
   receiving a data packet destined for a user equipment (UE) connected to an access node of the communication network, the first intermediate node being configured to communicate with the access node via at least a second intermediate node of the communication network;
   determining a forwarding address for the data packet based on a mapping associated with the access node; and
   sending the data packet to the forwarding address via the second intermediate node, without incorporating protocol headers related to the second intermediate node in the data packet.

2. The method of embodiment 1, wherein the data packet comprises a packet header associated with the access node, and the data packet is sent to the forwarding address without changing the packet header.

3. The method of embodiments 1-2, wherein the first and second intermediate nodes comprise a central unit (CU) and a distributed unit (DU), respectively, and the data packet is sent to the forwarding address via the F1 interface between the CU and the DU.

4. The method of embodiments 1-2, wherein the first intermediate node comprises a distributed unit (DU) and the second intermediate node comprises an IAB node, and the data packet is sent to the forwarding address via a radio bearer between the DU the IAB node.

5. The method of embodiments 1-2, wherein the mapping comprises a relationship between an address associated with the access node and a radio bearer between the first and second intermediate nodes.

6. The method of embodiment 5, wherein the address associated with the access node is one of an IP address, a GPRS Tunneling Protocol (GTP) Tunnel Endpoint Identifier (TEID), and a Medium Access Control (MAC) address.

7. The method of embodiment 1-5, wherein the data packet comprises control-plane (CP) information and the mapping is based on F1 Application Protocol (F1-AP) information identifying the access node.

8. The method of embodiments 1-5, wherein the data packet comprises user-plane (UP) information and the mapping is based on a GPRS Tunneling Protocol (GTP) Tunnel Endpoint Identifier (TEID) associated with the access node.

9. The method of embodiment 8, wherein the mapping is based on one or more GTP TEIDs associated with the access node but not associated with the first or the second intermediate nodes, and sending the data packet comprises transparently forwarding the data packet to the access node via a GTP tunnel through the second intermediate node.

10. The method of embodiments 1-5, wherein the forwarding address is an IP address associated with the access node and the determining is based on IP Network Address Translation (IP NAT).

11. The method of embodiments 1-5, wherein:
    the first intermediate node comprises one of a distributed unit (DU) or an IAB node; and
    the method further comprises receiving the mapping associated with the access node from a central unit (CU).

12. A first intermediate network node of a multi-hop, integrated access backhaul (JAB) communication network, comprising:
    processing circuitry configured to perform operations corresponding to any of the methods of embodiments 1-11; and
    power supply circuitry configured to supply power to the first intermediate network node.

13. A communication system including a host computer comprising:
    processing circuitry configured to provide user data; and a communication interface configured to forward the user data to a cellular network for transmission to a user equipment (UE) through an access node via at least first and second intermediate nodes;

wherein:
the access node comprises a radio interface and processing circuitry configured for communication with the U;
the second intermediate node comprises a radio interface and processing circuitry configured for communication with the access node and the first intermediate node; and
the first intermediate node comprises processing circuitry configured to perform operations corresponding to any of the methods of embodiments 1-11.

14. The communication system of embodiment 13, further comprising the UE configured to communicate with the access node.

15. The communication system of any of embodiments 13-14, wherein:
the processing circuitry of the host computer is configured to execute a host application, thereby providing the user data; and
the UE comprises processing circuitry configured to execute a client application associated with the host application.

16. The communication system of any of embodiments 13-15, wherein the communication system comprises a multi-hop, integrated access backhaul (IAB) communication network comprising the first intermediate node, the second intermediate node, and the access node.

17. A method implemented in a communication system including a host computer, a cellular network, and a user equipment (UE), the method comprising:
at the host computer, providing user data;
at the host computer, initiating a transmission carrying the user data to the UE via a cellular network comprising at least a first intermediate node; and
operations, performed by the first intermediate node, corresponding to any of the methods of embodiments 1-11.

18. The method of embodiment 17, wherein the data message comprises the user data, and further comprising transmitting the user data by the access node.

19. The method of any of embodiments 17-18, wherein the user data is provided at the host computer by executing a host application, the method further comprising, at the UE, executing a client application associated with the host application.

20. The method of any of embodiments 17-19, further comprising operations corresponding to any of the methods of embodiments 1-11, said operations performed by the second intermediate node towards the first intermediate node or a third intermediate node comprising the multi-hop IAB communication network.

21. A communication system including a host computer comprising a communication interface configured to receive user data originating from a transmission from a user equipment (UE) to an access node; and a first intermediate node comprising a radio interface and processing circuitry configured to perform operations corresponding to any of the methods of embodiments 1-11.

22. The communication system of embodiment 21, further including the access node.

23. The communication system of embodiments 21-22, further including a second network node arranged with the first intermediate node in a multi-hop integrated access backhaul (IAB) configuration, and comprising radio interface circuitry and processing circuitry configured to perform operations corresponding to any of the methods of embodiments 1-11.

24. The communication system of any of embodiments 21-23, further including the UE, wherein the UE is configured to communicate with at least one of the first and second network nodes.

25. The communication system of any of embodiments 21-24, wherein:
the processing circuitry of the host computer is configured to execute a host application;
the UE is configured to execute a client application associated with the host application, thereby providing the user data to be received by the host computer.

What is claimed is:

1. A method performed by a first intermediate node of a multi-hop, integrated access backhaul (IAB) communication network, the method comprising:
receiving a data packet destined for a target node of the communication network, the first intermediate node being configured to communicate with the target node via at least a second intermediate node of the communication network, the data packet comprising control-plane information;
determining an address for the data packet based on a mapping function associated with the target node, the mapping function being based on F1 Application Protocol (F1-AP) information and Stream Control Transmission Protocol (SCTP) information identifying the target node, the mapping function comprising a relationship between one or more addresses associated with the target node and one or more radio bearers between the first and second intermediate nodes;
forming a packet header for the data packet, the packet header including the address, and forming the packet header comprising at least one of the following operations:
excluding one or more higher-layer protocol headers related to the second intermediate node, and
incorporating without modification a portion, associated with the target node, of an existing header of the data packet; and
sending the data packet, comprising the packet header, to the address via the second intermediate node.

2. The method of claim 1, wherein the mapping function is based on Internet Protocol (IP) information.

3. The method of claim 1, wherein the data packet comprises user-plane information and the mapping function is based on at least one of the following associated with the target node: General Packet Radio Service (GPRS) Tunneling Protocol (GTP) Tunnel Endpoint Identifier (TEID); and Internet Protocol (IP) information.

4. The method of claim 1, wherein:
the target node is an access node serving a user equipment (UE);
the data packet is a downlink data packet destined for the UE via the access node;
the first intermediate node comprises a base station distributed unit (gNB-DU);
the second intermediate node comprises an IAB node; and
the data packet is sent to the address via a radio bearer between the gNB-DU and the IAB node.

5. The method of claim 1, wherein:
the target node is a base station centralized unit (gNB-CU) of the communication network;
the data packet is an uplink data packet transmitted by a user equipment (UE);
the first intermediate node comprises a first IAB node;
the second intermediate node comprises a second IAB node or a base station distributed unit (gNB-DU); and
the data packet is sent to the address via a radio bearer between the first IAB node and the second IAB node.

6. The method of claim 1, wherein each of the one or more addresses associated with the target node is one of the following: an IP address, a General Packet Radio Service (GPRS) Tunneling Protocol (GTP) Tunnel Endpoint Identifier (TEID); and a layer-2 address.

7. The method of claim 1, wherein:
the received data packet comprises one or more higher-layer protocol addresses associated with the target node;
the address comprises a layer-2 address associated with the target node and a radio bearer between the first and second intermediate nodes; and
the data packet is sent to the second intermediate node via the radio bearer.

8. The method of claim 7, wherein the one or more higher-layer protocols comprise one or more of the following: Internet Protocol (IP); User Datagram Protocol (UDP); and General Packet Radio Service (GPRS) Tunneling Protocol (GTP).

9. The method of claim 1, wherein the mapping function comprises a relationship between the address and a plurality of higher-layer protocol addresses associated only with the target node.

10. The method of claim 1, wherein the mapping function comprises a relationship between the address and the following:
one or more General Packet Radio Service (GPRS) Tunneling Protocol (GTP) tunnel endpoint identifiers (TEIDs) associated only with the target node; and
one or more Internet Protocol (IP) addresses associated only with the target node.

11. The method of claim 1, wherein sending the data packet comprises transparently forwarding the data packet to the target node via a General Packet Radio Service (GPRS) Tunneling Protocol (GTP) tunnel through the second intermediate node.

12. The method of claim 1, wherein the packet header comprises one or more of the following types of headers associated with the target node: Internet Protocol (IP); User Datagram Protocol (UDP); and General Packet Radio Service (GPRS) Tunneling Protocol (GTP).

13. The method of claim 1, wherein the excluded one or more higher-layer protocol headers include one or more of the following types of headers comprising addresses associated with the second intermediate node: Internet Protocol (IP); User Datagram Protocol (UDP); and General Packet Radio Service (GPRS) Tunneling Protocol (GTP).

14. The method of claim 1, further comprising:
receiving an indication that a path to the target node via the second intermediate node is unavailable;
forming a packet header for the data packet, wherein the packet header includes the address, and wherein forming the packet header comprises at least one of the following operations:
excluding one or more higher-layer protocol headers related to the third intermediate node, and
incorporating without modification a portion, associated with the target node, of an existing header of the data packet; and
sending the data packet, comprising the packet header, to the address via the third intermediate node.

15. The method of claim 1, further comprising receiving the mapping function associated with the target node from a base station centralized unit (gNB-CU).

16. A first intermediate network node of a multi-hop, integrated access backhaul (IAB) communication network, the first intermediate node comprising:
power supply circuitry configured to supply power to the first intermediate network node;
processing circuitry; and
one or more device-readable media containing computer-executable instructions that, when executed by the processing circuitry, configures the network node to:
receive a data packet destined for a target node of the communication network, the first intermediate node being configured to communicate with the target node via at least a second intermediate node of the communication network, the data packet comprising control-plane information;
determine an address for the data packet based on a mapping function associated with the target node, the mapping function being based on F1 Application Protocol (F1-AP) information and Stream Control Transmission Protocol (SCTP) information identifying the target node, the mapping function comprising a relationship between one or more addresses associated with the target node and one or more radio bearers between the first and second intermediate nodes;
form a packet header for the data packet, the packet header including the address, and forming the packet header comprising at least one of the following operations:
excluding one or more higher-layer protocol headers related to the second intermediate node, and
incorporating without modification a portion, associated with the target node, of an existing header of the data packet; and
send the data packet, comprising the packet header, to the address via the second intermediate node.

17. The first intermediate network node of claim 16, wherein the processing circuitry further comprises transceiver circuitry configured to communicate with the at least a second intermediate node.

18. The first intermediate network node of claim 16, wherein the mapping function is based on Internet Protocol (IP) information.

19. The first intermediate network node of claim 16, wherein the data packet comprises user-plane information and the mapping function is based on at least one of the following associated with the target node: General Packet Radio Service (GPRS) Tunneling Protocol (GTP) Tunnel Endpoint Identifier (TEID); and Internet Protocol (IP) information.

20. The first intermediate network node of claim 19, wherein execution of the instructions further configures the first intermediate network to receive the mapping function associated with the target node from a base station centralized unit (gNB-CU).

21. The first intermediate network node of claim 16, wherein:
the target node is an access node serving a user equipment (UE);

the data packet is a downlink data packet destined for the UE via the access node;

the first intermediate node comprises a base station distributed unit (gNB-DU);

the second intermediate node comprises an IAB node; and the data packet is sent to the address via a radio bearer between the gNB-DU and the IAB node.

22. The first intermediate network node of claim 16, wherein:

the target node is a base station centralized unit (gNB-CU) of the communication network;

the data packet is an uplink data packet transmitted by a user equipment (UE);

the first intermediate node comprises a first IAB node;

the second intermediate node comprises a second IAB node or a base station distributed unit (gNB-DU); and the data packet is sent to the address via a radio bearer between the first IAB node and the second IAB node.

23. The first intermediate network node of claim 16, wherein each of the one or more addresses associated with the target node is one of the following: an IP address; a General Packet Radio Service (GPRS) Tunneling Protocol (GTP) Tunnel Endpoint Identifier (TEID); and a layer-2 address.

24. The first intermediate network node of claim 16, wherein:

the received data packet comprises one or more higher-layer protocol addresses associated with the target node;

the address comprises a layer-2 address associated with the target node and a radio bearer between the first and second intermediate nodes; and the data packet is sent to the second intermediate node via the radio bearer.

25. The first intermediate network node of claim 24, wherein the excluded one or more higher-layer protocols comprise one or more of the following: Internet Protocol (IP); User Datagram Protocol (UDP); and General Packet Radio Service (GPRS) Tunneling Protocol (GTP).

26. The first intermediate network node of claim 16, wherein the mapping function comprises a relationship between the address and a plurality of higher-layer protocol addresses associated only with the target node.

27. The first intermediate network node of claim 16, wherein the mapping function comprises a relationship between the address and the following:

one or more General Packet Radio Service (GPRS) Tunneling Protocol (GTP) tunnel endpoint identifiers (TEIDs) associated only with the target node; and one or more Internet Protocol (IP) addresses associated only with the target node.

28. The first intermediate network node of claim 16, wherein execution of the instructions configures the first intermediate network node to send the data packet by transparently forwarding the data packet to the target node via a General Packet Radio Service (GPRS) Tunneling Protocol (GTP) tunnel through the second intermediate node.

29. The first intermediate network node of claim 16, wherein the packet header comprises one or more of the following types of headers associated with the target node: Internet Protocol (IP); User Datagram Protocol (UDP); and General Packet Radio Service (GPRS) Tunneling Protocol (GTP).

30. The first intermediate network node of claim 16, wherein the one or more higher-layer protocol headers include one or more of the following types of headers comprising addresses associated with the second intermediate node: Internet Protocol (IP); User Datagram Protocol (UDP); and General Packet Radio Service (GPRS) Tunneling Protocol (GTP).

31. The first intermediate network node of claim 16, wherein execution of the instructions further configures the first intermediate network node to:

receive an indication that a path to the target node via the second intermediate node is unavailable;

form a packet header for the data packet, wherein the packet header includes the address, and wherein forming the packet header comprises at least one of the following operations:

excluding one or more higher-layer protocol headers related to the third intermediate node, and incorporating without modification a portion, associated with the target node, of an existing header of the data packet; and send the data packet, comprising the packet header, to the address via the third intermediate node.

32. A non-transitory, computer-readable medium storing computer-executable instructions that, when executed by processing circuitry comprising a first intermediate node of an integrated access backhaul (IAB) network, configure the first intermediate node to perform a method comprising:

receiving a data packet destined for a target node of the communication network, the first intermediate node being configured to communicate with the target node via at least a second intermediate node of the communication network, the data packet comprising control-plane information;

determining an address for the data packet based on a mapping function associated with the target node, the mapping function being based on F1 Application Protocol (F1-AP) information and Stream Control Transmission Protocol (SCTP) information identifying the target node, the mapping function comprising a relationship between one or more addresses associated with the target node and one or more radio bearers between the first and second intermediate nodes;

forming a packet header for the data packet, the packet header including the address, and forming the packet header comprising at least one of the following operations:

excluding one or more higher-layer protocol headers related to the second intermediate node, and incorporating without modification a portion, associated with the target node, of an existing header of the data packet; and sending the data packet, comprising the packet header, to the address via the second intermediate node.

* * * * *